(12) United States Patent
Wang et al.

(10) Patent No.: US 11,121,816 B2
(45) Date of Patent: Sep. 14, 2021

(54) SYMBOL DETECTION OF MASSIVE MIMO SYSTEMS WITH UNKNOWN SYMBOL-DEPENDENT TRANSMIT-SIDE IMPAIRMENTS

(71) Applicant: Mitsubishi Electric Research Laboratories, Inc., Cambridge, MA (US)

(72) Inventors: Pu Wang, Boston, MA (US); Toshiaki Koike-Akino, Belmont, MA (US); Milutin Pajovic, Boston, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 73 days.

(21) Appl. No.: 16/703,710

(22) Filed: Dec. 4, 2019

(65) Prior Publication Data
US 2021/0176008 A1    Jun. 10, 2021

(51) Int. Cl.
*H04B 7/04* (2017.01)
*H04L 1/06* (2006.01)
(Continued)

(52) U.S. Cl.
CPC ......... *H04L 1/0675* (2013.01); *H04B 7/0452* (2013.01); *H04B 17/336* (2015.01); *H04L 27/364* (2013.01)

(58) Field of Classification Search
CPC ............... H04B 1/7097; H04B 1/7103; H04B 1/7105; H04B 1/71057; H04B 7/0413;
(Continued)

(56) References Cited

U.S. PATENT DOCUMENTS

| 9,674,003 | B2 * | 6/2017 | Kant | H04L 25/067 |
| 2018/0123837 | A1 * | 5/2018 | Barbu | H04L 25/0242 |
| 2019/0317315 | A1 * | 10/2019 | Wang | G02B 26/101 |

OTHER PUBLICATIONS

Singh et al., Computationally efficient variational Bayesian method for PAPR reduction in multiuser MIMO-OFDM systems, Wiley ETRI Journal, 10 pages, Sep. 2018.*

(Continued)

*Primary Examiner* — Frank Duong
(74) *Attorney, Agent, or Firm* — Gennadiy Vinokur; Hironori Tsukamoto

(57) ABSTRACT

An apparatus for processing a perturbation quantity received in a wireless network. The perturbation quantity including a non-linear effect from at least one transmitted signal of the wireless network. The apparatus including a Base Station (BS) configured to establish a link between the BS and a user equipment (UE). A processing circuit is configured to implement receiver-side decoders. Wherein a receiver-side decoder is configurable to provide a recovery of unknown symbols perturbed by the perturbation quantity, the recovery is at a receiver-side and the perturbation is at the transmitter-side. Provide receiver-side decoding for symbol detection of symbol-dependent transmit-side perturbations by imposing a hierarchical signal model on the transmitted symbol. Wherein the decoding that is provided by the receiver-side decoders is used to recover the unknown symbols perturbed by the perturbation quantity and to identify symbol dependent perturbations, to reduce decoding processing costs by either the UE or the BS.

18 Claims, 20 Drawing Sheets

(51) Int. Cl.
*H04L 27/36* (2006.01)
*H04B 17/336* (2015.01)
*H04B 7/0452* (2017.01)

(58) Field of Classification Search
CPC ............... H04B 7/0452; H04B 17/336; H04L 1/0054; H04L 1/0675; H04L 27/364
See application file for complete search history.

(56) References Cited

OTHER PUBLICATIONS

Bao et al., An Efficient Bayesian PAPR Reduction Method for OFDM-Based Massive MIMO Systems, IEEE, 13 pages, Jun. 2016.*

Cheng et al., Channel Estimation for FDD Multi-User Massive MIMO: A Variational Bayesian Inference-Based Approach, IEEE, 13 pages, Nov. 2017.*

Wang et al., Variational Bayesian Symbol Detection for Massive MIMO Systems with Symbol-Dependent Transmit Impairments, IEEE, 6 pages, Dec. 2019.*

* cited by examiner

*(Diagram for Block 160 to update the posterior of the effective transmitted symbol)*

(Diagram for Block 190 to update the model parameters (noise variance and perturbation bounds))

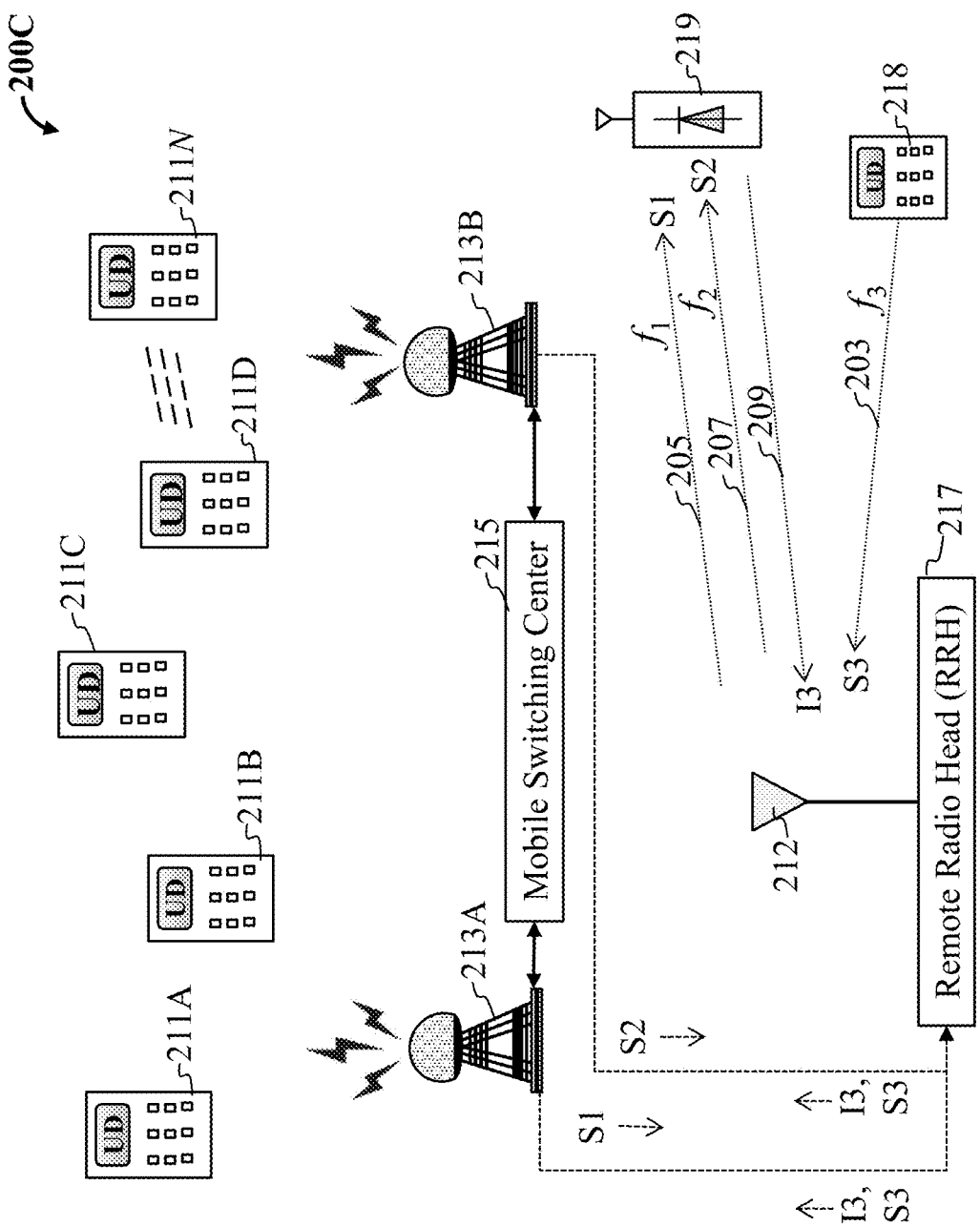
FIG. 2C (Passive Interference)

*(Computer Device)*

*(Mobile Computer Device)*

SYMBOL DETECTION OF MASSIVE MIMO SYSTEMS WITH UNKNOWN SYMBOL-DEPENDENT TRANSMIT-SIDE IMPAIRMENTS

FIELD

The present disclosure relates to apparatuses, systems and methods for processing impairments in a communication system supporting a multi-user Multiple-Input Multiple-Output (MIMO) scheme, and more particularly, adaptively processing impairments and symbol detection in the communication system with unknown symbol-dependent transmit-side impairments.

BACKGROUND

Massive multiple-input multiple-output (MIMO) is a promising technology to meet today's growing demands for an increased throughput and better quality-of-service of next-generation wireless communication systems. These Massive MIMO systems are equipped with a large number of antennas at a base station (BS) that simultaneously serves a much smaller number of single-antenna users sharing the same time-frequency slot.

However, these massive MIMO systems pose challenges that severely impact today's communication systems due to certain design and hardware implementations that are configured to address today's increasing communication technological demands. For example, these communication systems are arranged in such a way that hardware costs and power consumption are prohibitively high as the number of antennas at the BS is large and often are employed with high-resolution analog-to-digital convertors (ADCs). In addition, transmit impairments for these systems cause many challenges for the massive MIMO systems that are yet to be addressed for today's communication systems. In fact, convention communication transceivers are affected by hardware impairments such as non-linearities of power amplifiers, I/Q imbalance, phase-drifts due to non-ideal oscillators, and carrier frequency offsets, that can severely impact today's communication systems.

Physical transceiver implementations consist of many different hardware devices (e.g., amplifiers, converters, mixers, filters, and oscillators) and each component has an impairment quantity that distorts signals. These hardware imperfections or impairments are unavoidable, and the severity of these impairments are often designed into communication systems based on intended engineering decisions. Larger distortions are deliberately introduced (designed into systems) to decrease hardware cost and/or power consumption. The non-ideal behavior of each component is modeled in detail that results in transceiver impairments that limits throughput and an amount of quality of the signals for today's wireless communication systems. As a result, these massive MIMO systems end up failing to provide an increased throughput and better quality-of-service.

Accordingly, there is need for developing apparatuses, systems and methods that can adaptively process impairments in a communication system with unknown symbol-dependent transmit-side impairments, among other aspects.

SUMMARY

The present disclosure relates to apparatuses, systems and methods for adaptively processing impairments in a communication system supporting a multi-user Multiple-Input Multiple-Output (MIMO) scheme, with unknown symbol-dependent transmit-side impairments.

The present disclosure addresses some of the real-world communication transceivers problems affected by impairments, such as non-linear impairments generated by non-linear characteristics of active devices or non-linear impairments generated by passive devices. Particularly, symbol-dependent perturbations can be fully accounted in some of the embodiments of the present dislcosure including designing a hierarchical signal model as unknown model parameters. Accordingly, some aspects of the present disclosure provide apparatuses, systems and methods for processing impairments using a variational Bayesian inference approach for a low-complexity symbol detection for massive MIMO systems with symbol-dependent transmit-side impairments in a communication system supporting a multi-user MIMO scheme. Wherein the developed variational Bayesian symbol detector of the present disclosure is configured to learn the unknown perturbations in an iterative fashion.

An embodiment of the present disclosure includes an apparatus for processing a perturbation quantity received in a wireless network, the perturbation quantity includes a non-linear effect from a transmitted signal(s) of the wireless network. The apparatus has a Base Station(s) (BS) with at least one antenna or an array of antennas, configured for data transmission. The BS is configured for wireless communication with a User Equipment (UE) in the wireless network, and is configured to establish a link between the BS and the UE, to provide a plurality of transmitted and uplink data streams. A processing circuit can be configured to implement receiver-side decoders. Wherein a receiver-side decoder of the receiver-side decoders can be configurable to provide a remotely configurable recovery of unknown symbols perturbed by the perturbation quantity. The recovery is at a receiver-side and the perturbation is at the transmitter-side, such that the receiver is either for an uplink transmission at the BS or for a downlink transmission at the UE. Further, the processing circuit can provide receiver-side decoding for symbol detection of symbol-dependent transmit-side perturbations by imposing a hierarchical signal model on the transmitted symbol. Wherein the decoding that is provided by the receiver-side decoders can be used to recover the unknown symbols perturbed by the perturbation quantity and to identify symbol dependent perturbations, to reduce an amount of decoding processing costs by either the UE or the BS.

To better understand how the embodiments of the present disclosure process impairments including the perturbation quantity generated in the wireless communication system, there needs to be an explanation of how impairments are generated and what are impairments/pertubations? For example, impairments including the perturbation quantity can be generated in the wireless communication system when a signal is transmitted along a signal path that includes devices with non-linear transmission characteristics. These impairments can differ in frequency from the signal or signals from which they were generated, and cause interference to other signals. The generation of non-linear impairments such as active and passive intermodulation impairments are a problem in today's wireless communication systems, and in particular cellular wireless systems. Non-linear systems can be generally composed of active components, meaning that the components must be biased with an external power source which is not the input signal, i.e. the active components must be "turned on". For example, in a cellular base station, this non-linear behavior can be attributed to the active components such as non-linearities of power amplifiers, I/Q imbalance, phase-drifts due to non-ideal oscillators, and carrier frequency offsets, by non-limiting example. Wherein the non-linearities of the active components can be in the transmitter, i.e. power amplifiers, and/or in the receiver (such as the low noise amplifier (LNA) or a frequency converter). Other non-linear impairments can be generated by the passive devices or passive intermodulation (PIM) sources and/or passive harmonic (PH) sources. The PIM sources could occur in many places, some examples can be in a radio's filter, connectors, cable assembly from the radio to the antenna, in multiplexers, if multiple radios are multiplexed onto the same cable or antenna, in the antenna, or in the environment external to the antenna.

Symbol-Dependent Perturbations: The above non-linear behavior from hardware at transmitters can be symbol-dependent. That is, the nonlinear effects are different if the transmitted symbols are different, mainly due to different activation behaviors at power amplifiers, I/Q imbalance, and antenna feeding circuits.

The non-linear interference generate interference at multiple frequencies. This interference can be problematic when some of the generated interference falls into an assigned receive channel of the base station. The interference can desensitize the receiver, thereby reducing performance of the receiver. One of the problems associated with non-linear interference is when the interference couples into the receiver and the interference overlaps an assigned frequency channel for the receiver. The interference will degrade the quality of the received signal in the receiver, thereby degrading performance. Also, the receiver can experience a reduced throughput of successful message delivery which causes lower channel unitlization rate and efficiency and higher link congestion. Another problem can be poor quality-of-service due to higher bit error rates (BER) when the transmitter-side perturbation is severe.

Some reasons for these problems can be that the available radio frequency spectrum has been steadily expanded over time as additional bands have become available. Also, the pattern of allocation of uplink and downlink bands within the available spectrum for use by various cellular systems has become more complex. In this situation, i.e. a cellular radio base station by non-limiting example, non-linear impairments are generated from transmitted carriers in one or more downlink bands within an uplink band in which signals are received at the base station.

At least one cause for an increase in the generated impairments in today's communication systems, as noted above, can be due to the designs and hardware implementations in order to keep up with the increasing technological demands of the communication industries. Some other negative effects from these designs is an increase in hardware costs and power consumption which becomes prohibitively high as the number of antennas at the BTS increase, along with the increase use of high-resolution analog-to-digital converters (ADCs).

Some embodiments of the present disclosure model impairments or perturbations due to transmit-side impairments as an independent additive distortion and, more explicitly, by a truncated Gaussian distribution. The assumption of the Gaussian distribution is due to an aggregate effect of all hardware impairments along the transmit channel (e.g., power amplifiers, converters, mixers, filters, oscillators, etc.). Moreover, the truncation in the truncated Gaussian distribution, simply implies that the impact of the hardware impairment is limited and cannot be arbitrarily large. In order to develop a low-complexity symbol detection algorithm, a hierarchical Gaussian mixture prior model is further imposed on the perturbed transmitted symbol to enforce a finite alphabet nature. The hierarchical truncated Gaussian mixture prior model uses the principles of generalized approximate message passing (GAMP) and variational Bayesian inference to develop a factorized or decoupled iterative detection algorithm. At least one challenge or issue to overcome is that, to update deterministic hyper-parameters, i.e., the means of the truncated Gaussian mixture model), needs an expectation of a logarithm of a normalization factor over the posterior distribution computed, which is difficult to derive in a closed-form expression. The deterministic hyper-parameters are model parameters that controls the prior knowledge about the perturbation. For instance, from past observations, signals form certain transmitters or devices have larger perturbations than other transmitters or devices. As a result, one can assign different hyper-parameters to reflect such differences. While running our algorithm, the deterministic hyper-parameters need to be updated as the prior knowledge has to be re-weighted by combining new information form current observed signals at the receivers.

To address the issue of updating the deterministic hyper-parameters, an approximate, closed-form updating rule is introduced to the hierarchical truncated Gaussian mixture prior model by adding small perturbations to the recovered symbol such that this perturbation leads to the minimized mean-squared errors between the observed signal and the recovered signal. The closed-form updating rule is provided by a least-square solution. Once the perturbation is optimized, the perturbed symbol boundaries are updated and will be used for the next iteration.

Wherein the performance of the truncated Gaussian mixture model has been numerically evaluated by using a Monte-Carlo simulation with a binary phase-shift keying (BPSK) constellation.

EXPERIMENTATION

During the development of some embodiments of the present disclosure various interference cancellation schemes were tested in a communication system supporting a multi-user MIMO scheme. However, the results of the testing proved that such interference cancellation schemes required a high processing complexity, and were inefficient since an interference cancellation operation must always be performed even though an interference signal did not influence detection of a desired signal. Also realized is that these interference cancellation schemes required a large amount of processing computation and power consumption, due to the interference cancellation operation always being required, as noted above. Some aspects learned were that there needs to be a different and new scheme for canceling interference resulting in decreasing processing complexity, computational processing time/costs, and less power consumption, for communication systems supporting multi-user MIMO schemes and/or massive MIMO schemes, in order to meet today's continued increasing communication technology demands of the communication industries.

According to an embodiment of the present disclosure, an apparatus for processing a perturbation quantity received in a wireless network, the perturbation quantity including a non-linear effect from at least one transmitted signal of the wireless network. The apparatus including at least one Base Station (BS) having at least one antenna configured for data transmission. The BS can be configured for wireless communication with a User Equipment (UE) in the wireless network. The BS can also be configured to establish a link between the BS and the UE, to provide a plurality of transmitted and uplink data streams. A processing circuit can be configured to implement receiver-side decoders. Wherein at least one receiver-side decoder of the receiver-side decoders can be configurable to provide a remotely configurable recovery of unknown symbols perturbed by the perturbation quantity. Wherein the recovery is at a receiver-side and the perturbation is at the transmitter-side, such that the receiver is either for an uplink transmission at the BS or for a downlink transmission at the UE. The processing circuit cam provide receiver-side decoding for symbol detection of symbol-dependent transmit-side perturbations by imposing a hierarchical signal model on the transmitted symbol. Wherein the decoding that is provided by the receiver-side decoders is used to recover the unknown symbols perturbed by the perturbation quantity and to identify symbol dependent perturbations, to reduce an amount of decoding processing costs by either the UE or the BS.

According to another embodiment of the present disclosure, a system for processing a perturbation quantity received in a wireless network, the perturbation quantity including a non-linear effect from at least one transmitted signal of the wireless network. Wherein at least one Base Station (BS) includes at least one antenna configured for data transmission. Such that the BS is configured for wireless communication with a User Equipment (UE) in the wireless network, and the BS is configured to establish a link between the BS and the UE, to provide a plurality of transmitted and uplink data streams. The system including a processing circuit, configured to implement receiver-side decoders. Wherein at least one receiver-side decoder of the receiver-side decoders is configurable to provide a remotely configurable recovery of unknown symbols perturbed by the perturbation quantity, wherein the recovery is at a receiver-side and the perturbation is at the transmitter-side. Such that the receiver is either for an uplink transmission at the BS or for a downlink transmission at the UE. Provide receiver-side decoding for symbol detection of symbol-dependent transmit-side perturbations by imposing a hierarchical signal model on the transmitted symbol. Wherein the decoding that is provided by the receiver-side decoders is used to recover the unknown symbols perturbed by the perturbation quantity and to identify symbol dependent perturbations, to reduce an amount of decoding processing costs by either the UE or the BS. A control element in communication with the processing circuit to implement an action, based on the recovery of the unknown symbols perturbed by the perturbation quantity.

According to another embodiment of the present disclosure, a method for processing a perturbation quantity received in a wireless network, the perturbation quantity including a non-linear effect from at least one transmitted signal of the wireless network. The method including implementing receiver-side decoders, such that at least one receiver-side decoder of the receiver-side decoders is configurable for providing a configurable recovery of unknown symbols perturbed by the perturbation quantity. Wherein the recovery is at a receiver-side and the perturbation is at the transmitter-side, such that the receiver is either for an uplink transmission at a base station (BS) or for a downlink transmission at a user equipment (UE). Providing receiver-side decoding for symbol detection of symbol-dependent transmit-side perturbations by imposing a hierarchical signal model on the transmitted symbol. Wherein the decoding that is provided by the receiver-side decoders is used to recover the unknown symbols perturbed by the perturbation quantity and to identify symbol dependent perturbations, to reduce an amount of decoding processing costs by either the UE or the BS, wherein a processing circuit is used to implement the method.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2C is a schematic illustrating some passive interference of the communication network, according to embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
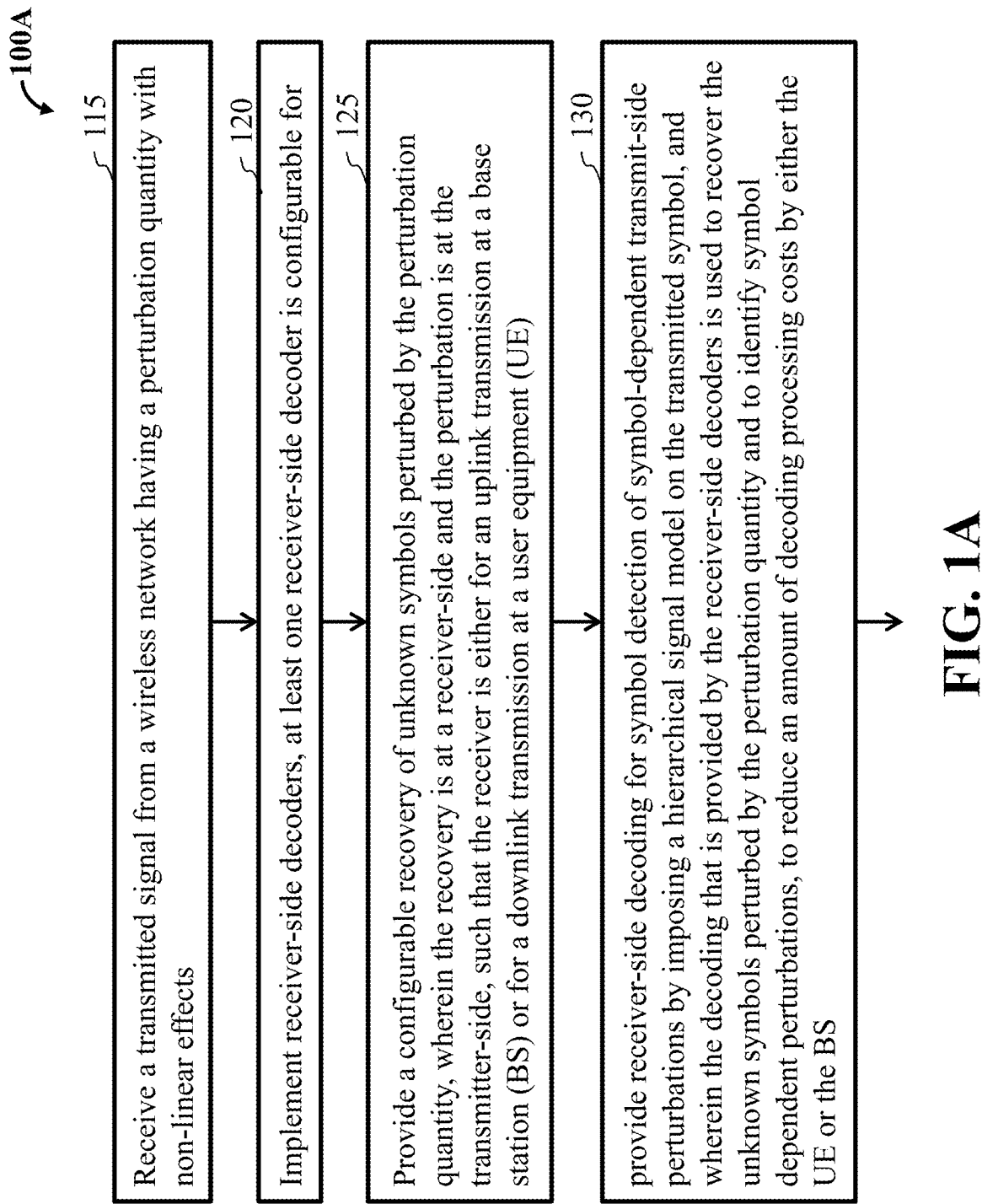
FIG. 1A is a flow diagram illustrating a system, according to embodiments of the present disclosure.

FIG. 1A is a flow diagram illustrating a system, according to embodiments of the present disclosure. For example, the system is for processing a perturbation quantity received in a wireless network, wherein the perturbation quantity includes a non-linear effect from at least one transmitted signal of the wireless network. At least one Base Station (BS) having at least one antenna is configured for data transmission, such that the BS is configured for wireless communication with a User Equipment (UE) in the wireless network. Also, the BS can be configured to establish a link between the BS and the UE, to provide a plurality of transmitted and uplink data streams.

Step 115 of FIG. 1A includes a receiver of a user equipment that receives a transmitted signal from a wireless network, such as a base station, the transmitted signal includes a perturbation quantity with non-linear effects.

Step 120 of FIG. 1A includes a processing circuit, configured to implement receiver-side decoders, wherein at least one receiver-side decoder of the receiver-side decoders is configurable to.

Step 125 of FIG. 1A includes providing a remotely configurable recovery of unknown symbols perturbed by the perturbation quantity, wherein the recovery is at a receiver-side and the perturbation is at the transmitter-side, such that the receiver is either for an uplink transmission at the BS or for a downlink transmission at the UE.

Step 130 of FIG. 1A includes providing receiver-side decoding for symbol detection of symbol-dependent transmit-side perturbations by imposing a hierarchical signal model on the transmitted symbol, and wherein the decoding that is provided by the receiver-side decoders is used to recover the unknown symbols perturbed by the perturbation quantity and to identify symbol dependent perturbations, to reduce an amount of decoding processing costs by either the UE or the BS.

An optional step 135 (not shown in FIG. 1A) can include a control element in communication with the processing circuit to implement an action, based on the recovery of the unknown symbols perturbed by the perturbation quantity, and/or the identified symbol dependent perturbations. The control element can be part of a network control of an management system that handles the operation, support and network tasks. Wherein the control element can be configured to collect information from another devices for processing interference in the wireless network, and/or be configured to diagnose and solve problems within the wireless network. Also, the the control element can be configured to correlate performance indications with other radio access networks, depending upon the specific application denoted by a user the control element can provide specific tasks.

Embodiments of the present disclosure provide unique aspects, by non-limiting example, can be to model the symbol-dependent transmitter-side symbol perturbation due to hardware impairments as random parameters with prior knowledge and recover the true symbols at the receiver-side by simultaneously learning the symbol and the transmitter-side perturbation by combining the prior knowledge and current observations.

Figure 1B:
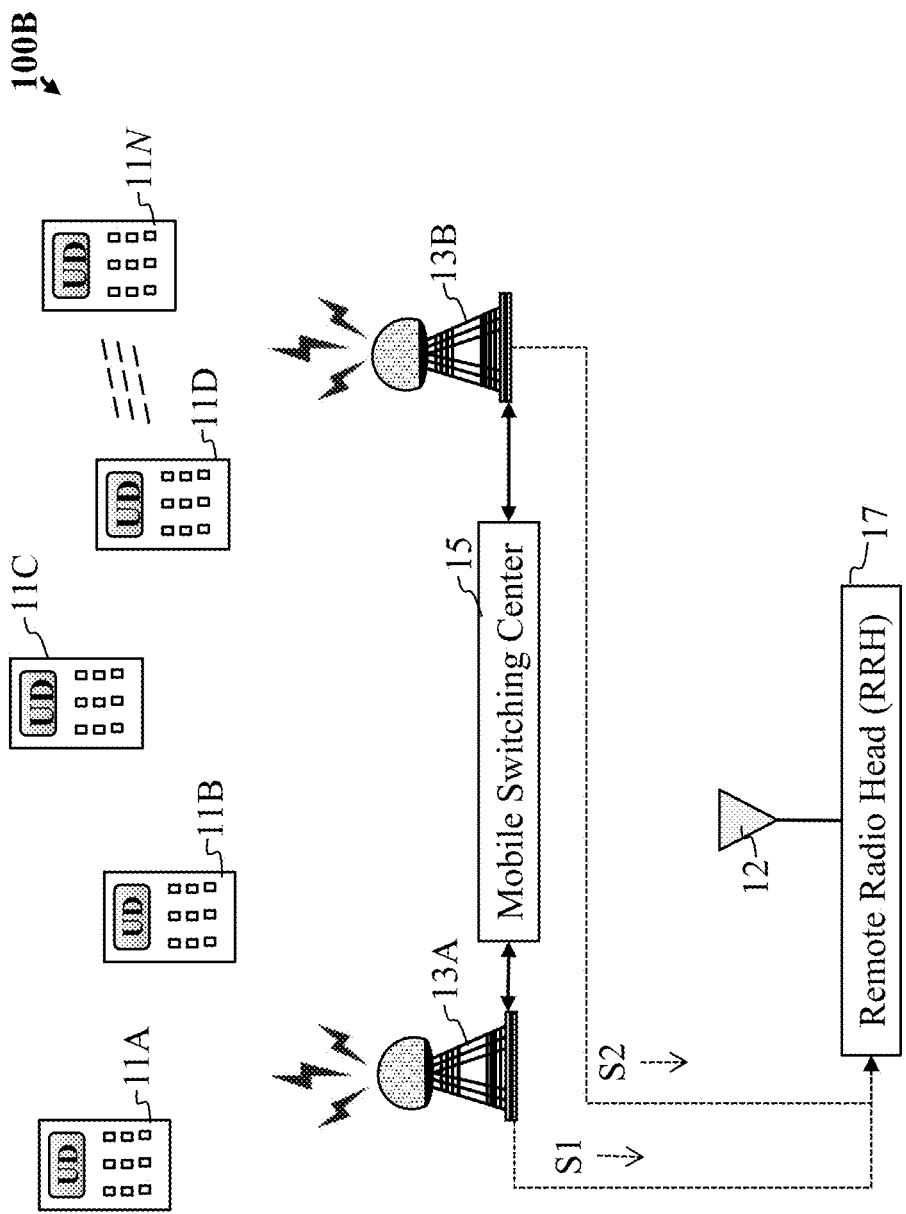
FIG. 1B is a schematic illustrating a communication system, according to an embodiment of the present disclosure.

FIG. 1B is a schematic illustrating a communication system, according to an embodiment of the present disclosure. The communication system 100B can include wireless devices 11A-11N located within range of at least one base transceiver station or base station 13A, 13B and at least one switching station 15. The base stations 13A, 13B and the mobile switching center 15 are in wireless communication with the wireless devices 11A-11N. While in operation, the wireless devices 11A-11N can wireless communicate data to the base stations 13A, 13B, wherein the base stations 13A, 13B can be connected to a hardwired connection, i.e. internet cable line or some other hardware connection, with the communication network 17. For example, the data that can be communicated, i.e. communicated in both directions, between the wireless devices 11A-11N and the base stations 13A, 13B can include data, i.e. voice data or other data. so the data can be communicated to the communication network. The type of communication between the wireless devices 11A-11N and the base stations 13A, 13B can in different types of formats including a narrowband channel, i.e. a channel in which the bandwidth of the message does not significantly exceed the channel's coherence bandwidth, or a wideband channel, i.e. when the message bandwidth significantly exceeds the coherence bandwidth of the channel.

Aspects of the base stations 13A, 13B can utilize a narrowband base station or a wideband digital base station that communicates with the wireless devices 11A-11N. The wireless devices 11A-11N and the base stations 13A, 13B can be configured to utilize beamforming and beamforming transmissions and utilize a multiple-input and multiple-output (MIMO) approach that multiplies the capacity of a radio link using multiple transmission and receiving antennas to exploit multipath propagation. The MIMO approach is an element of the wireless communication standards including IEEE 802.11n (Wi-Fi), IEEE 802.11ac (Wi-Fi), HSPA+ (3G), WiMAX (4G), and Long Term Evolution (4G LTE). MIMO can also be applied to power-line communication for 3-wire installations as part of ITU G.hn standard and HomePlug AV2 specification.

Still referring to FIG. 1B, some embodiments of the present disclosure can utilize Massive MIMO technology, where the number of terminals is much less than the number of base station (mobile station) antennas. In a scattering environment, the full advantages of the massive MIMO system can be exploited using simple beamforming strategies such as maximum ratio transmission (MRT), maximum ratio-combining (MRC) or zero forcing (ZF), i.e. where the channel state information can be available.

The mobile switching center 15 can be utilized for coordinating events of the base stations 13A, 13B so that the wireless devices 11A-11N can maintain communication with the base station 13A, 13B or with some other base stations (not shown) that are located elsewhere. For example, the mobile switching center 15 can assist in coordinating communication off to the wireless devices 11A-11N between the base stations 13A, 13B and another base stations (not shown) as a wireless device 11A-11N may roam between different regions that are covered by the base stations 13A, 13B.

Figure 1C:
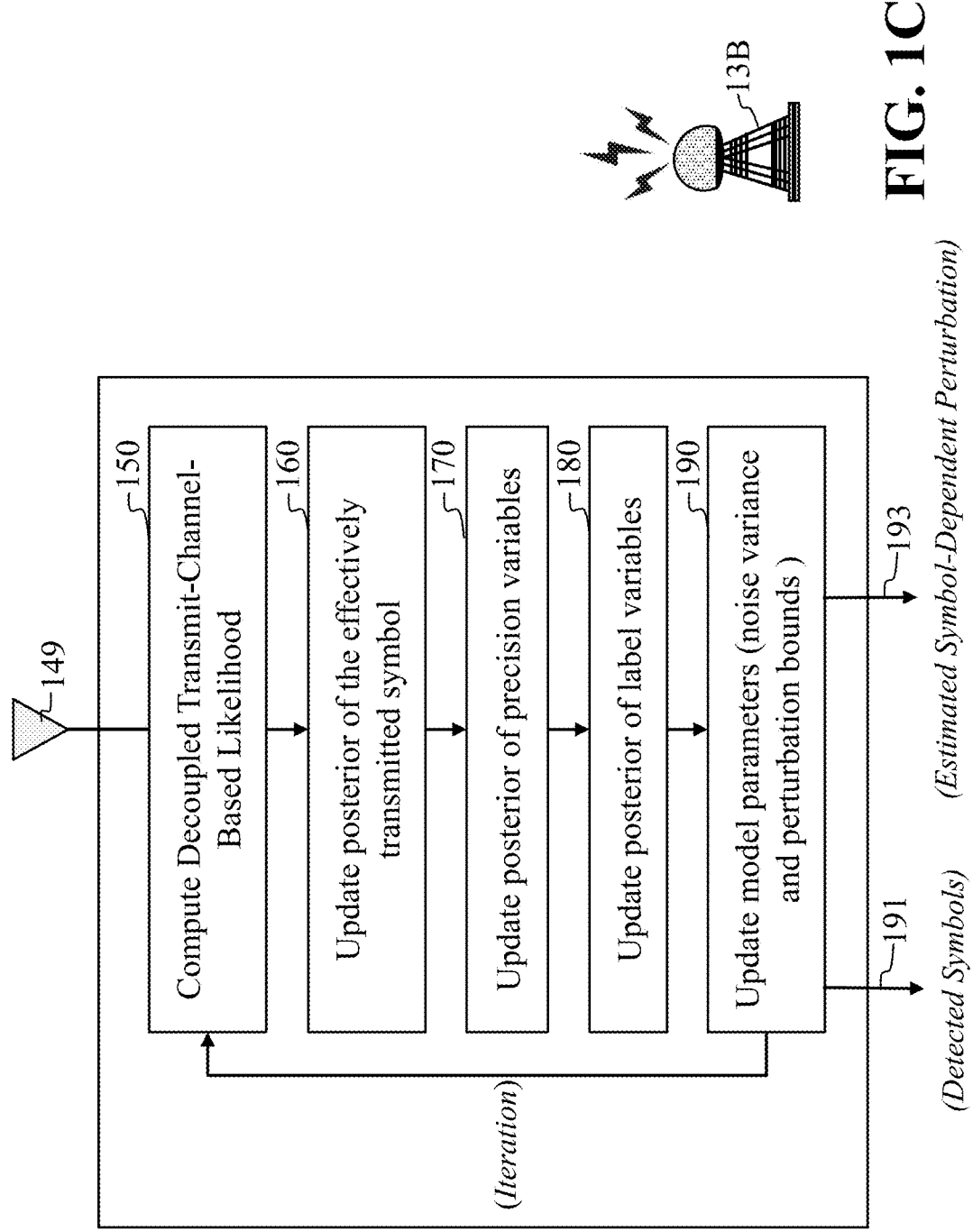
FIG. 1C is a schematic illustrating a workflow to simultaneously detect the symbols and estimate symbol-dependent perturbation from the received signal at the receiver by making use of the hierarchical truncated Gaussian mixture model for symbol detection, according to embodiments of the present disclosure.

FIG. 1C is a schematic illustrating some steps to simultaneously detect the symbols and estimate symbol-dependent perturbation from the received signal at the receiver by making use of the hierarchical truncated Gaussian mixture model for symbol detection, according to embodiments of the present disclosure. The received signals from antenna 149 are fed into the symbol detection module. First, the decoupled transmit-channel-based likelihood function is computed in block 150 with the updated values of model parameters which are the output of block 190. Then, we update the posterior of the effectively transmitted symbol posterior of the effectively transmitted symbol which is distributed as a truncated Gaussian distribution in block 160. Block 170 updates the posterior of precision variables for each symbol which is distributed as a Gamma distribution. Block 180 updates the posterior of label variables for each symbol which is distributed as a Bernouli distribution. Block 190 maximizes a cost function with respect to the unknown deterministic parameters including the noise variance and the perturbed transmitted symbols to update these model parameters. The above process then repeats for a number of iterations. At the end of the iterations, it outputs the detected symbols 191 and symbol-dependent perturbations 193.

Variational Bayesian Symbol Detection

According to the above hierarchical signal model, we utilize the variational Bayesian inference for the posterior distributions of hidden random variables $\{x, c, \alpha_1, \alpha_2\}$ and updating rules for unknown model parameters, i.e., the deterministic perturbation parameters $\{v_1, v_2\}$ and noise variance $\beta^{-1}$.

Figure 1D:
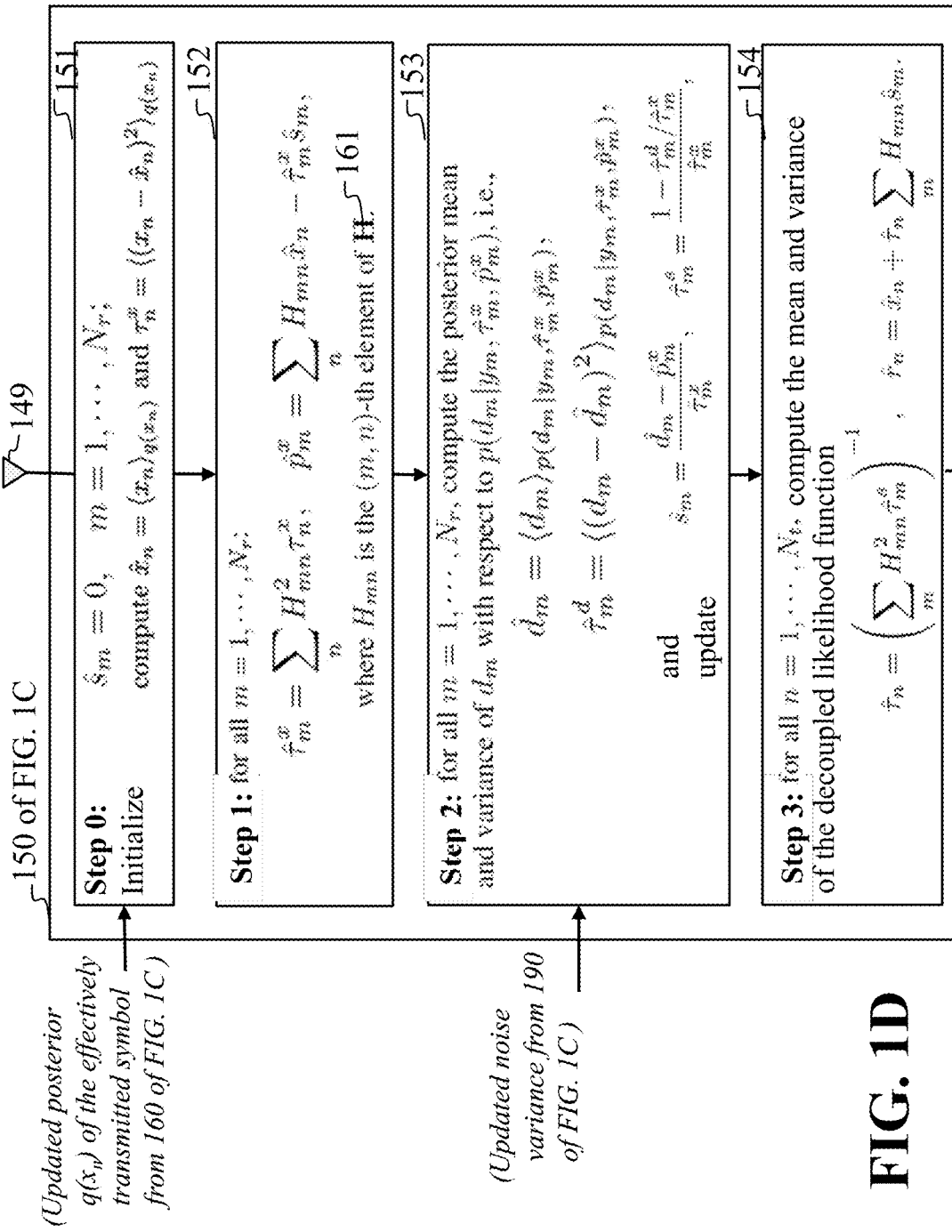
FIG. 1D is a schematic illustrating steps of block 150 of FIG. 1C to compute the decoupled likelihood function, according to embodiments of the present disclosure.

FIG. 1D is a schematic illustrating some steps of block 150 of FIG. 1C to compute the decoupled likelihood function, according to embodiments of the present disclosure. Step 151 initializes the computation procedure by setting $\hat{s}_m=0$, $m=1, \ldots, N_r$; with inputs $\hat{x}_n=\langle x_n \rangle_{q(x_n)}$ and $\tau_n^x = \langle (x_n-\hat{x}_n)^2 \rangle_{q(x_n)}$. Step 152 updates the parameters $\hat{\tau}_m^x$ and $\hat{p}_m^x$ for all M receiver antennas by using the channel matrix elements and initiated values. Step 153 computes the posterior mean and variance of the equivalent noise-free received signal at each antenna. Step 154 computes the mean and variance of the decoupled likelihood function at each antenna which is a Gaussian distribution.

Decoupled Transmit-Channel-Based Likelihood Function

The receiver-channel-based likelihood function of y is given by $$p(y \mid x; \beta) = \frac{1}{(2\pi\beta^{-1})^{N_r/2}} e^{-\frac{\beta\|y-Hx\|_2^2}{2}}, \quad (15)$$

where the measurement $y_m$ at each receive channel includes contributions from all effectively transmitted symbols $\{x_n\}_{n=1}^{N_t}$ due to the mixing channel matrix H. In order to derive the posterior distributions, it is necessary to factorize the receiver-channel-based likelihood function to a decoupled transmit-channel-based likelihood function. This can be done by using the GAMP framework which approximates the likelihood function as a product of approximate marginal likelihoods:

$$p(y \mid x; \beta) \approx \prod_{n=1}^{N_t} p(x_n \mid \hat{r}_n, \hat{\tau}_n) = \prod_{n=1}^{N_t} \frac{1}{\sqrt{2\pi\hat{\tau}_n}} e^{-\frac{(x_n-\hat{r}_n)^2}{2\hat{\tau}_n}}. \quad (16)$$

As a result, the receiver-channel-based likelihood function is approximately decoupled in the transmit-channel sense (with respect to the transmitting antenna index n). For each transmit-channel, we have an equivalent Gaussian marginal likelihood with mean $\hat{r}_n$ and variance $\hat{\tau}_n$. The detailed derivation of mean and variance can be found in Appendix. It is worth noting that this decoupling process of (16) has been used in the massive MIMO symbol detection and the peak-to-average power ratio reduction for MIMO-OFDM systems.

To get the approximate likelihood function of (16), we need to compute the approximate mean $\hat{r}_n$ and variance $\hat{\tau}_n$, which can be obtained by using the GAMP algorithm with inputs from the means $\hat{x}_n = \langle x_n \rangle_{q(x_n)}$, variances $$\tau_n^x = \langle (x_n - \hat{x}_n)^2 \rangle_{q(x_n)},$$

and the noise variance $\beta^{-1}$. Particularly, to compute the decoupled likelihoods $\mathcal{N}(x_n \mid \hat{r}_n, \hat{\tau}_n)$ and the posterior likelihood of the noiseless measurement $\mathcal{N}(d_m \mid \hat{d}_m, \hat{\tau}_m^w)$, we follow the steps below:

Initialize $\hat{s}_m = 0$, $m=1, \ldots, N_r$;

Step 1: for all $m=1, \ldots, N_r$;

$$\hat{\tau}_m^x = \sum_n H_{mn}^2 \tau_n^x, \quad \hat{p}_m^x = \sum_n H_{mn}\hat{x}_n - \hat{\tau}_m^x \hat{s}_m,$$

where $H_{mn}$ is the (m,n)-th element of H.

Step 2: for all $m=1, \ldots, N_r$, compute the posterior mean and variance of $d_m$ with respect to $p(d_m \mid y_m, \hat{\tau}_m^x, \hat{p}_m^x)$, i.e., $$\hat{d}_m = \langle d_m \rangle_{p(d_m \mid y_m, \hat{\tau}_m^x, \hat{p}_m^x)},$$

$$\hat{\tau}_m^d = \langle (d_m - \hat{d}_m)^2 \rangle_{p(d_m \mid y_m, \hat{\tau}_m^x, \hat{p}_m^x)},$$

and update $$\hat{s}_m = \frac{\hat{d}_m - \hat{p}_m^x}{\hat{t}_m^x}, \hat{t}_m^s = \frac{1 - \hat{t}_m^d/\hat{t}_m^x}{\hat{t}_m^x},$$

Step 3: for all n=1, . . . , $N_t$, compute the mean and variance of the decoupled likelihood function $$\hat{\tau}_n = \left(\sum_m H_{mn}^2 \hat{t}_m^s\right)^{-1}, \hat{r}_n = \hat{x}_n + \hat{\tau}_n \sum_m H_{mn} \hat{s}_m.$$

Figure 1E:
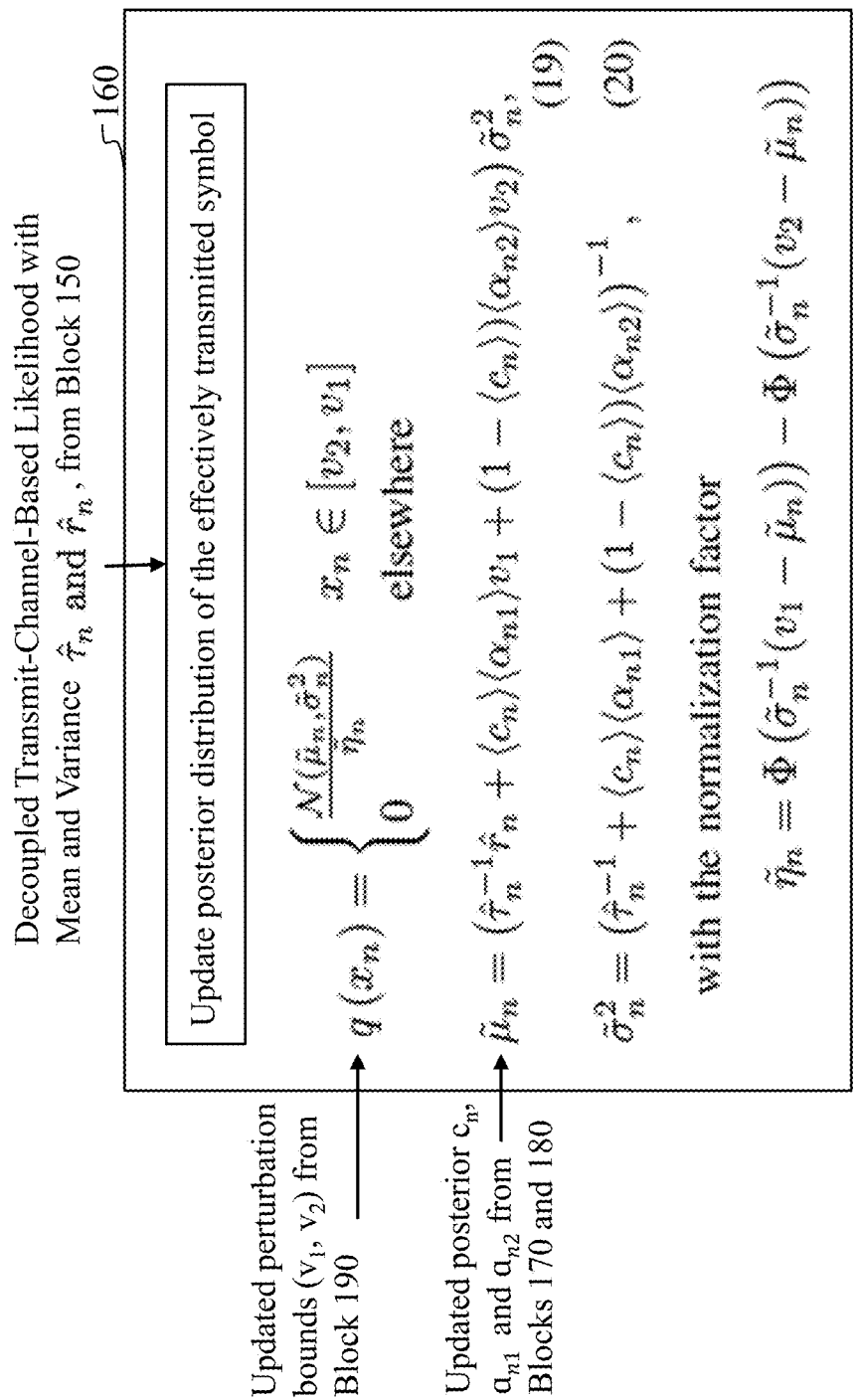
FIG. 1E is a schematic illustrating steps of block 160 of FIG. 1C to update the posterior of the effective transmitted symbol, according to embodiments of the present disclosure.

FIG. 1E is a schematic illustrating some steps of block 160 of FIG. 1C to update the posterior of the effective transmitted symbol, according to embodiments of the present disclosure. The posterior is a truncated Gaussian distribution with mean computed by equation (19) and variance by equation (20). Note that the mean and variance are a function of the mean and variance of the above decoupled likelihood function at each antenna from block 150. They are also a function of posterior mean of precision variables from block 170 and label variables from block 180. The truncation bounds are from the updated model parameters in block 190.

Posterior of the Effectively Transmitted Symbol x:
We first start with the derivation of the posterior distribution of the effectively transmitted symbol vector x. With (10) and (16) and by only keeping terms related to $x_n$, we have $$\ln|q(x) = \langle \ln p(y, x, \alpha_1, \alpha_2, c; \theta) \rangle_{q(\alpha_1)q(\alpha_2)q(c)} + const = \quad (17)$$

$$\langle \ln[p(y|x;\beta)p(x|\alpha_1, \alpha_2, c; v_1, v_2)] \rangle_{q(\alpha_1)q(\alpha_2)q(c)} + const =$$

$$-\frac{1}{2}\sum_{n=1}^{N_t}\left[\hat{\tau}_n^{-1}(x_n - \hat{r}_n)^2 + \langle c_n \rangle\langle \alpha_{n1} \rangle(x_n - v_1)^2 + \right.$$

$$(1-\langle c_n\rangle)\langle\alpha_{n2}\rangle(x_n - v_2)^2 \bigg] + const =$$

$$-\frac{1}{2}\sum_{n=1}^{N_t}(\hat{\tau}_n^{-1} + \langle c_n\rangle\langle\alpha_{n1}\rangle + (1-\langle c_n\rangle)\langle\alpha_{n2}\rangle)x_n^2 -$$

$$2(\hat{\tau}_n^{-1}\hat{r}_n + \langle c_n\rangle\langle\alpha_{n1}\rangle v_1 + (1-\langle c_n\rangle)\langle\alpha_{n2}\rangle v_2)x_n +$$

$$const, \text{ if } x_n \in [v_2, v_1],$$

where $v_1 = v + b$ and $v_2 = -v + b$. This implies the posterior distribution of x can be factorized into independent truncated Gaussian distribution, $$q(x_n) = \begin{cases} \frac{\mathcal{N}(\tilde{\mu}_n, \tilde{\sigma}_n^2)}{\tilde{\eta}_n} & x_n \in [v_2, v_1] \\ 0 & \text{elsewhere} \end{cases} \quad (18)$$

where the posterior mean $\tilde{\mu}_n$ and variance $\tilde{\sigma}_n^2$ are given as $$\tilde{\mu}_n = (\hat{\tau}_n^{-1}\hat{r}_n + \langle c_n\rangle\langle\alpha_{n1}\rangle v_1 + (1-\langle c_n\rangle)\langle\alpha_{n2}\rangle v_2)\tilde{\sigma}_n^2, \quad (19)$$

$$\tilde{\sigma}_n^2 = (\hat{\tau}_n^{-1} + \langle c_n\rangle\langle\alpha_{n1}\rangle + (1-\langle c_n\rangle)\langle\alpha_{n2}\rangle)^{-1}, \quad (20)$$

with the normalization factor $$\eta_n = \Phi(\tilde{\sigma}_n^{-1}(v_1 - \tilde{\mu}_n)) - \Phi(\tilde{\sigma}_n^{-1}(v_2 - \tilde{\mu}_n)), \quad (21)$$

Figure 1F:
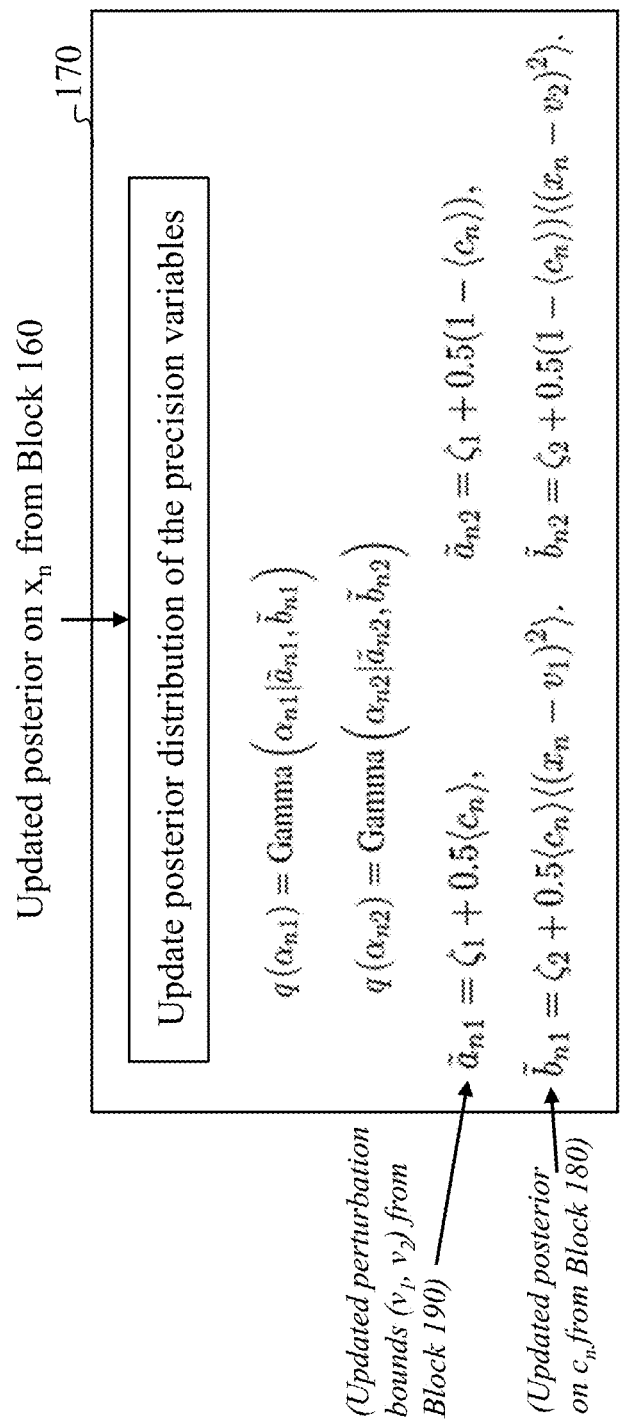
FIG. 1F is a schematic illustrating steps of block 170 of FIG. 1C to update the posterior of the precision variables, according to embodiments of the present disclosure.

FIG. 1F is a schematic illustrating some steps of block 170 of FIG. 1C to update the posterior of the precision variables, according to embodiments of the present disclosure. The posterior is a Gamma distribution with two parameters a and b. The parameters $a_1$ and $a_2$ are a function of posterior mean of label variables from block 180. The parameters $b_1$ and $b_2$ are a function of posterior mean of label variables from block 180, posterior moments of the effectively transmitted symbol from block 160, and updated truncation bounds from block 190.

Posterior of precision variables $\{\alpha_1, \alpha_2\}$:
With (13) and (16) and by only keeping terms related to $\alpha_{n1}$, we have $$\ln q(\alpha_1) = \langle \ln p(y, x, \alpha_1, \alpha_2, c; \theta) \rangle_{q(x)q(\alpha_2)q(c)} + const =$$

$$\langle \ln[p(x|\alpha_1, \alpha_2, c; v_1, v_2)p(\alpha)] \rangle_{q(x)q(\alpha_2)q(c)} + const =$$

$$\sum_{n=1}^{N_t}[(0.5\langle c_n\rangle + \zeta_1 - 1)\ln\alpha_{n1} -$$

$$(0.5\langle c_n\rangle\langle(x_n - v_1)^2\rangle + \zeta_2)\alpha_{n1} - \langle c_n\rangle \ln\eta_{n1}] + const,$$

$$\approx \sum_{n=1}^{N_t}[(0.5\langle c_n\rangle + \zeta_1 - 1)\ln\alpha_{n1} - (0.5\langle c_n\rangle\langle(x_n - v_1)^2\rangle + \zeta_2)\alpha_{n1}] + const,$$

where we have used the updated value $\ln f_{n1}^{(t)}$ to replace $\ln \eta_{n1}$ and make it irrelevant to the posterior distribution of $\alpha_{n1}$. As a result, the posterior distribution of $\alpha_1$ can be factorized into independent Gamma distribution, i.e.

$$q(\alpha_{n1}) = \text{Gamma}(\alpha_{n1}|\tilde{a}_{n1}, \tilde{b}_{n1}), \quad (22)$$

where $$\tilde{a}_{n1} = \zeta_1 + 0.5\langle c_n\rangle, \quad (23)$$

$$\tilde{b}_{n1} = \zeta_2 + 0.5\langle c_n\rangle\langle(x_n - v_1)^2\rangle, \quad (24)$$

Similarly, the posterior distribution of $\alpha_2$ can be factorized into independent Gamma distribution, i.e.

$$q(\alpha_{n2}) = \text{Gamma}(\alpha_{n2}|\tilde{a}_{n2}, \tilde{b}_{n2}), \quad (25)$$

where $$\tilde{a}_{n2} = \zeta_1 + 0.5(1 - \langle c_n\rangle), \quad (26)$$

$$\tilde{b} = \zeta_2 + 0.5(1 - \langle c_n\rangle)\langle(x_n - v_2)^2\rangle, \quad (27)$$

Figure 1G:
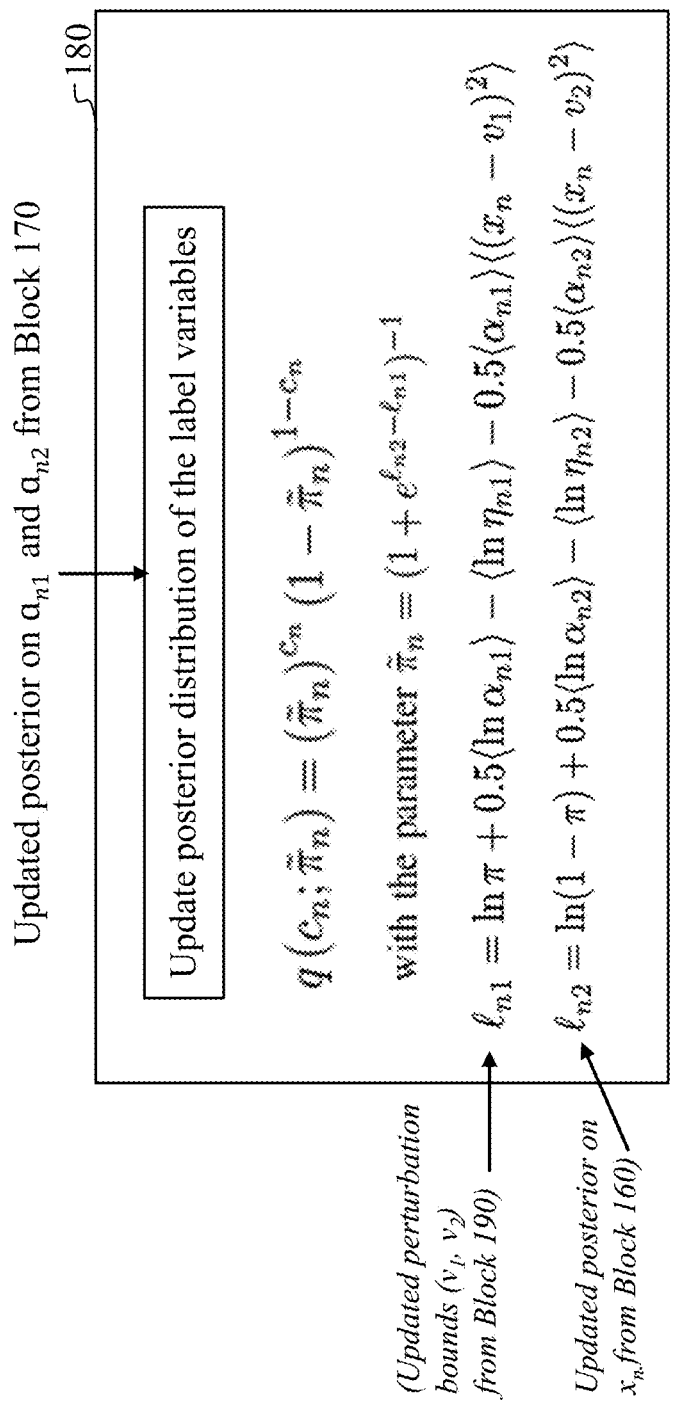
FIG. 1G is a schematic illustrating steps of block 180 of FIG. 1C to update the posterior of the label variables, according to embodiments of the present disclosure.

FIG. 1G is a schematic illustrating some steps of block 180 of FIG. 1C to update the posterior of the label variables, according to embodiments of the present disclosure. The posterior is a Bernouli distribution with a parameter $\tilde{\pi}_n$. The parameter are a function of posterior quantities of the effectively transmitted symbol from block 160, posterior quantities of the precision variables from block 170, and updated truncation bounds from block 190.

Posterior of the Label Variable c:
For the last class of hidden variables, the binary label variable $c \in \{0,1\}$, its posterior distribution can be inferred as $$\ln q(c) = \langle \ln p(y, x, \alpha_1, \alpha_2, c; \theta) \rangle_{q(x)q(\alpha_1)q(\alpha_2)} + const \quad (28)$$

$$= \langle \ln[p(x|\alpha_1, \alpha_2, c; v_1, v_2)p(c)] \rangle_{q(x)q(\alpha_1)q(\alpha_2)} + const$$

$$= \sum_{n=1}^{N_t}(\ell_{n1} - \ell_{n2})c_n + const,$$

where $l_{n1} = \ln \pi + 0.5 \langle \ln \alpha_{n1} \rangle - \langle \ln \eta_{n1} \rangle - 0.5 \langle \alpha_{n1} \rangle \langle (x_n - v_1)^2 \rangle$ and $l_{n2} = \ln(1-\pi) + 0.5 \langle \ln \alpha_{n2} \rangle - \langle \ln \eta_{n2} \rangle - 0.5 \langle \alpha_{n2} \rangle \langle (x_n - v_2)^2 \rangle$. The computation of the posterior quantities $\langle \ln \eta_{n1} \rangle$ and $\langle \ln \eta_{n2} \rangle$ is quite involved and can be replaced by their updated values $\ln \eta_{n1}^{(t)}$ and $\ln \eta_{n2}^{(t)}$ from the previous iteration. As a result, c has independent posterior Bernoulli distribution with the parameter $\tilde{\pi}_n = (1 + e^{l_{n2} - l_{n1}})^{-1}$, $$q(c_n; \tilde{\pi}_n) = (\tilde{\pi}_n^{c_n}(1-\tilde{\pi}_n)^{1-c_n}, \quad (29)$$

Compared with the prior distribution of cn in (11), the posterior distribution is no longer identical since the parameter $\tilde{\pi}_n$ is now dependent on the index n.

Computation of Posterior Quantities:

To update the above posterior distributions, we need to compute the following posterior quantities:

$$\langle x_n \rangle = \tilde{\mu}_n - \frac{\tilde{\sigma}_n}{\tilde{\eta}_n} \left[ \phi \left( \frac{v_1 - \tilde{\mu}_n}{\tilde{\sigma}_n} \right) - \phi \left( \frac{v_2 - \tilde{\mu}_n}{\tilde{\sigma}_n} \right) \right],$$

$$\langle x_n^2 \rangle = \tilde{\mu}_n \langle x_n \rangle + \tilde{\sigma}_n^2 - \frac{\tilde{\sigma}_n}{\tilde{\eta}_n} \left[ v_1 \phi \left| \left( \frac{v_1 - \tilde{\mu}_n}{\tilde{\sigma}_n} \right) - v_2 \phi \left( \frac{v_2 - \tilde{\mu}_n}{\tilde{\sigma}_n} \right) \right. \right],$$

$$\langle \alpha_{n1} \rangle = \tilde{a}_{n1}/\tilde{b}_{n1}, \langle \alpha_{n2} \rangle = \tilde{a}_{n2}/\tilde{b}_{n2}$$

$$\langle \ln \alpha_{n1} \rangle = \psi(\tilde{a}_{n1}) - \ln \tilde{b}_{n1}, \langle \ln \alpha_{n2} \rangle = \psi(\tilde{a}_{n2}) - \ln \tilde{b}_{n2}$$

$$\langle c_n \rangle = \frac{1}{1 + e^{l_{n2} - l_{n1}}},$$

where $\phi(x)$ is the standard normal probability density function at the value of x, and $\psi(\alpha) = \partial \ln \Gamma(\alpha)/\partial \alpha$ is the digamma function.

Figure 1H:
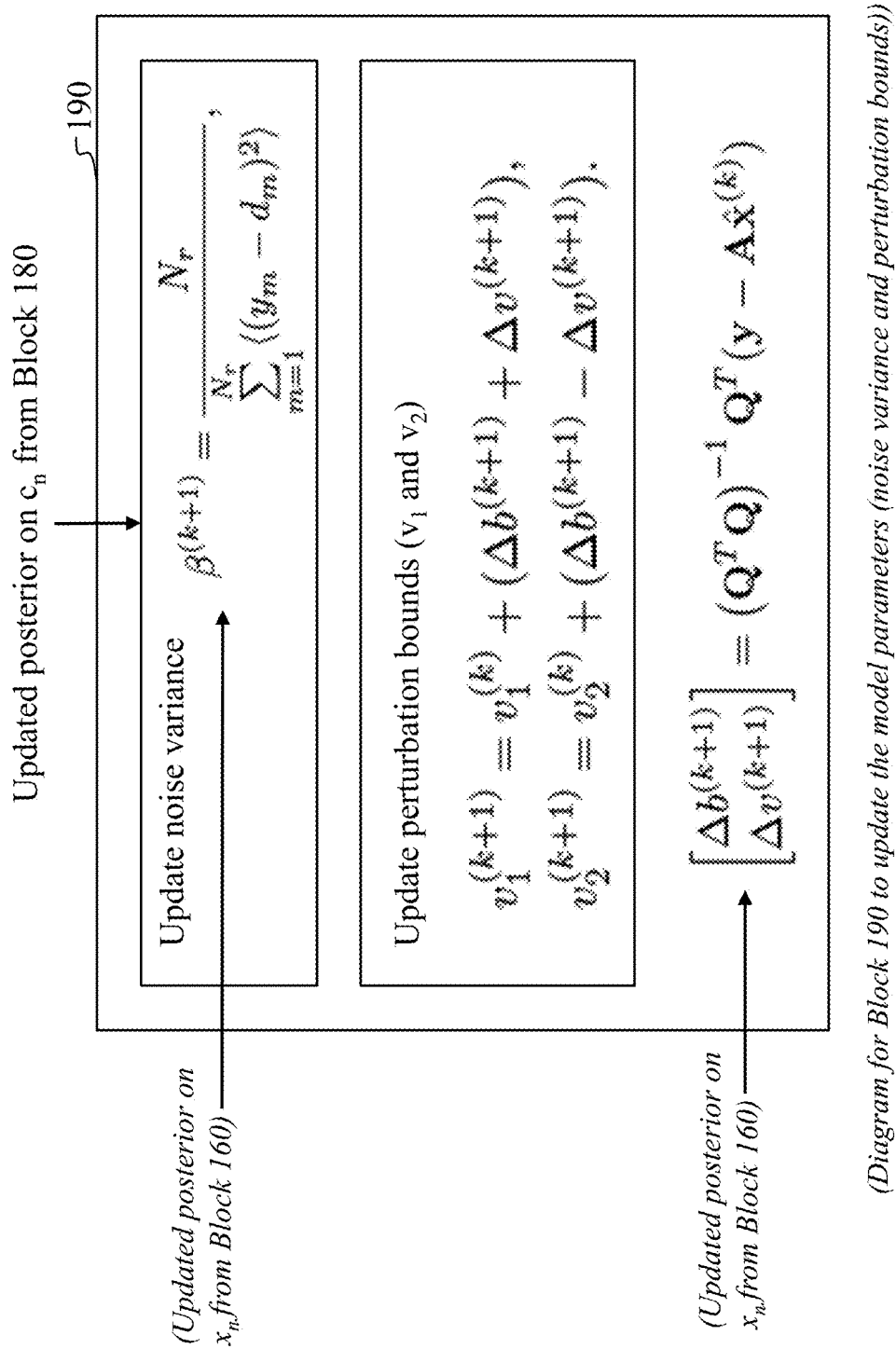
FIG. 1H is a schematic illustrating steps of block 190 of FIG. 1C to update the model parameters (noise variance and perturbation bounds), according to embodiments of the present disclosure.

FIG. 1H is a schematic illustrating some steps of block 190 of FIG. 1C to update the model parameters (noise variance and perturbation bounds), according to embodiments of the present disclosure. Block 191 updates the noise variance estimate. Block 193 updates the two perturbation bounds.

Update of Deterministic Model Parameters:

In the following, we obtain the updating rules for three deterministic parameters $\theta = \{\beta, v_1, v_2\}$. The general rule is to maximize the Q-function with respect to the unknown parameters, $$\{\theta^{NEW}\} = \underset{\theta}{\arg\max} \langle \ln p(y, x, \alpha_1, \alpha_2, c; \theta) \rangle_{q(x)q(\alpha_1)q(\alpha_2)q(c)}$$

where the Q-function is obtained as the expectation of the logarithm of the complete likelihood function (y, x, $\alpha_1$, $\alpha_2$, c) with respect to the posterior distributions of all hidden variables $\{x, \alpha_1, \alpha_2, c\}$.

First, the corresponding Q-function of $\beta$ can be expressed as $$Q(\beta, \beta^{(k)}) = \sum_{m=1}^{N_r} \langle \ln p(y_m \mid d_m; \beta) \rangle_{p(d_m\mid y; \beta)} + const., \quad (30)$$

where $y_m = d_m + v_m$ and $d_m$ is the m-th element of the noiseless measurement $d = Hx$ whose posterior distribution $p(d_m|y; \beta)$ can be found in Step 2 of the Appendix. In other words, the equivalent variable d can summarize all contributions from the hidden variables $\{x, \alpha_1, \alpha_2, c\}$. Then it is straightforward to show that $$Q(\beta, \beta^{(k)}) = -\frac{1}{2} \sum_{m=1}^{N_r} [\ln \beta + \beta \langle (y_m - d_m)^2 \rangle] + const, \quad (31)$$

which yields $$\beta^{(k+1)} = \frac{N_r}{\sum_{m=1}^{N_r} \langle (y_m - d_m)^2 \rangle}, \quad (32)$$

where the expectation is taken over the posterior distribution of dm.

Next, to update the two unknown boundary values $\{v_1, v_2\}$, the corresponding Q-function of $\{v_1, v_2\}$ is difficult to find a closed form expression. Alternatively, we consider a least-square updating procedure. Specifically, we minimize the following cost function $$[\Delta b^{(k+1)}, \Delta v^{(k+1)}] = \underset{\Delta b, \Delta v}{\arg\min} \left\| y - A(\hat{x}^{(k)} + \Delta b \mathbf{1} + \Delta v h) \right\|_2^2, \quad (33)$$

where 1 is the all-one vector and $h_n = h(n) = 1$ if $x_n^{(k)} > \hat{b}^{(k)}$ or $h_n = -1$ if $x_n^{(h)} \leq \hat{b}^{(k)}$ with $\hat{b}^{(k)} = (\hat{v}_1^{(k)} + \hat{v}_2^{(k)})/2$ denoting the estimated middle point of the unknown interval at the k-th iteration. It can be seen that the updating rule of $\{v_1, v_2\}$ is converted to the updating of the middle point b and the marginal distance v to the current estimate of bounds by finding the optimal adjustments $\{\Delta b, \Delta v\}$. More precisely, (33) minimizes the data fitting error using the current estimate of x, i.e., $\hat{x}^{(k)}$, the adjustment of the mean $\Delta b$ and its marginal distance $\Delta v$ to the two boundaries. The exact solution of $\{\Delta b, \Delta v\}$ is given as $$\begin{bmatrix} \Delta b^{(k+1)} \\ \Delta v^{(k+1)} \end{bmatrix} = (Q^T Q)^{-1} Q^T (y - A\hat{x}^{(k)}), \quad (34)$$

where $Q = A[\mathbf{1}, h]$. Finally, the two boundaries $\{v_1, v_2\}$ can be updated as $$v_1^{(k+1)} = v_1^{(k)} + (\Delta b^{(k+1)} + \Delta v^{(k+1)}),$$

$$v_2^{(k+1)} = v_2^{(k)} + (\Delta b^{(k+1)} - \Delta v^{(k+1)}). \quad (35)$$

Transmit-Side Impairments/Inferences/Intermodulation's

Figure 2A:
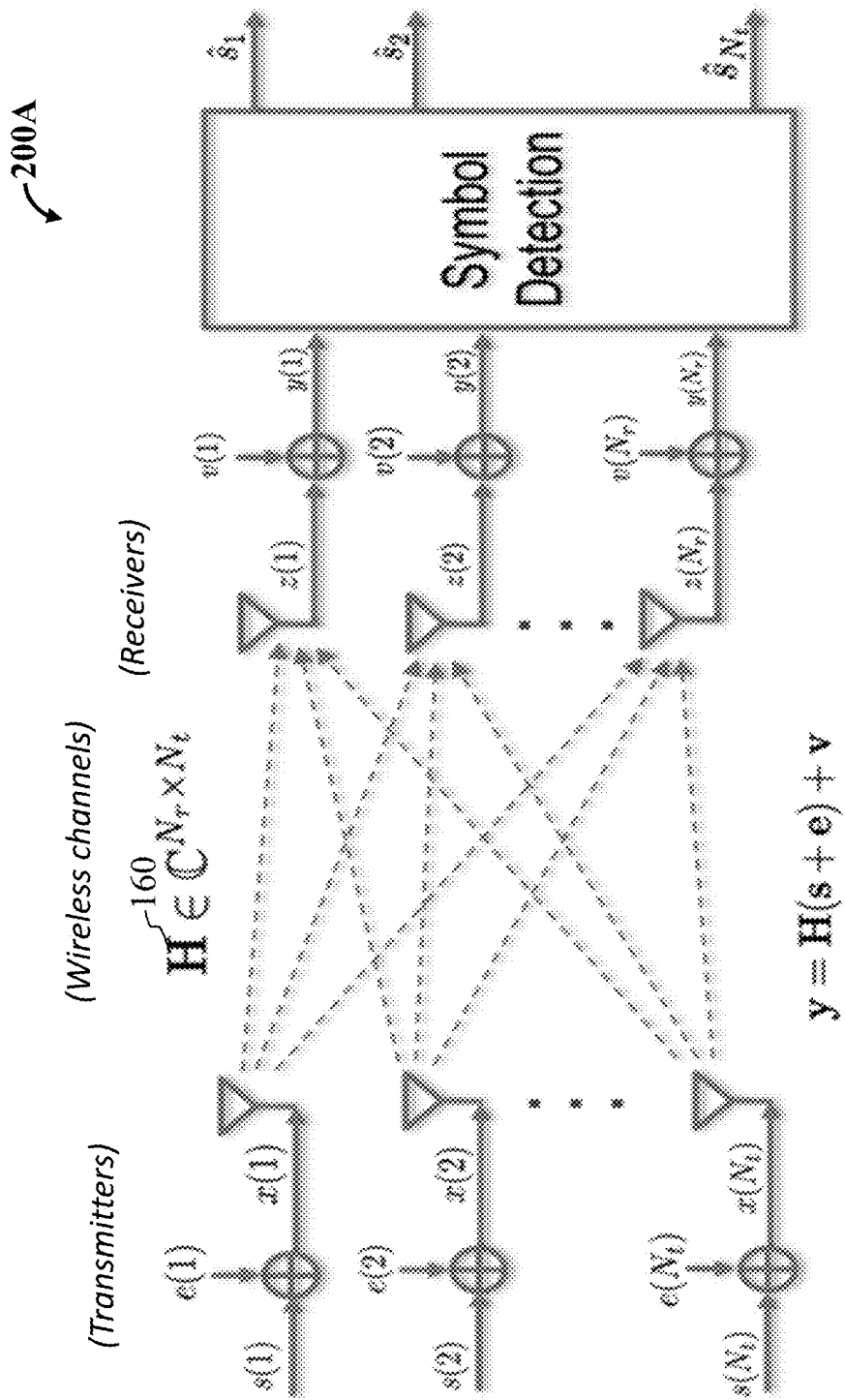
FIG. 2A is a schematic illustrating a signal model for received signals y and symbol detection module for massive MIMO systems with transmit-side impairments, according to embodiments of the present disclosure.

FIG. 2A is a schematic illustrating a signal model for received signals y and symbol detection module for massive MIMO systems with transmit-side impairments, according to embodiments of the present disclosure. For example, FIG. 2A shows the system model of a massive MIMO with $N_t$ transmitting antennas with each antenna sending an effectively transmitted symbol $x(n_t)$ 2030 and $N_r$ receiving antennas with received signal $z(n_r)$ 2040. The received signal at each antenna is contaminated by additive receiver noise $v(n_r)$ 2050. The noisy received signals 2060 from all Nr receiving antennas are used for the symbol detection module to output the detected symbols 191. For each effectively transmitted symbol, it consists of the unperturbed symbol $s(n_t)$ 2010 and a symbol-dependent perturbation $e(n_t)$ 2020. The channel matrix 160 is an Nr×Nt matrix with each element indicating the channel state between one transmitting antenna and one receiving antenna.

Still referring to FIG. 2A, consider a massive MIMO system with $N_t$ transmit and $N_r$ receive antennas. The transmitted symbols take values from a finite constellation set $\mathcal{A}$ (e.g., PSK or QAM). Without loss of generality, we assume $\mathcal{A} = \{\pm 1\}$. Let $s \in \mathcal{A}^{N_t}$ denote the nominal transmitted vector and $H \in \mathcal{CN}^{r \times N_t}$ (denote the channel gain matrix, whose entries are assumed to be independent and identically distributed (i.i.d.) Gaussian with zero mean and unit variance. The received vector $y \in \mathcal{CN}^{r \times 1}$ is given by $$y = Hx + v = H(s+e) + v, \quad (1)$$

where x is the perturbed transmitted vector due to the transmit impairment, e is the transmit perturbation vector, and v is the Gaussian distributed noise with zero mean and an unknown variance $\beta^{-1}$, i.e., $v \sim \mathcal{N}(0, \beta^{-1} I_M)$. Moreover, the nominal transmitted symbol $y_n \in \{-1, 1\}$ follows a Bernoulli distribution, $$p(s_n; \pi) = (\pi)^{(1+s_n)/2} (1-\pi)^{(1-s_n)/2}, \quad (2)$$

where $\pi = 0.5$. In addition, the transmit hardware impairment introduces a symbol-dependent permutation vector e, $$e_n = \begin{cases} u_1 & s_n = 1 \\ u_2 & s_n = -1 \end{cases}, \quad (3)$$

where $u_1$ and $u_2$ are unknown but deterministic variables.

The problem of interest is, given the received vector y, to detect the true transmitted symbol s by taking into account the binary nature of s and in the case of unknown symbol-dependent transmit impairments e.

Active Interference

Figure 2B:
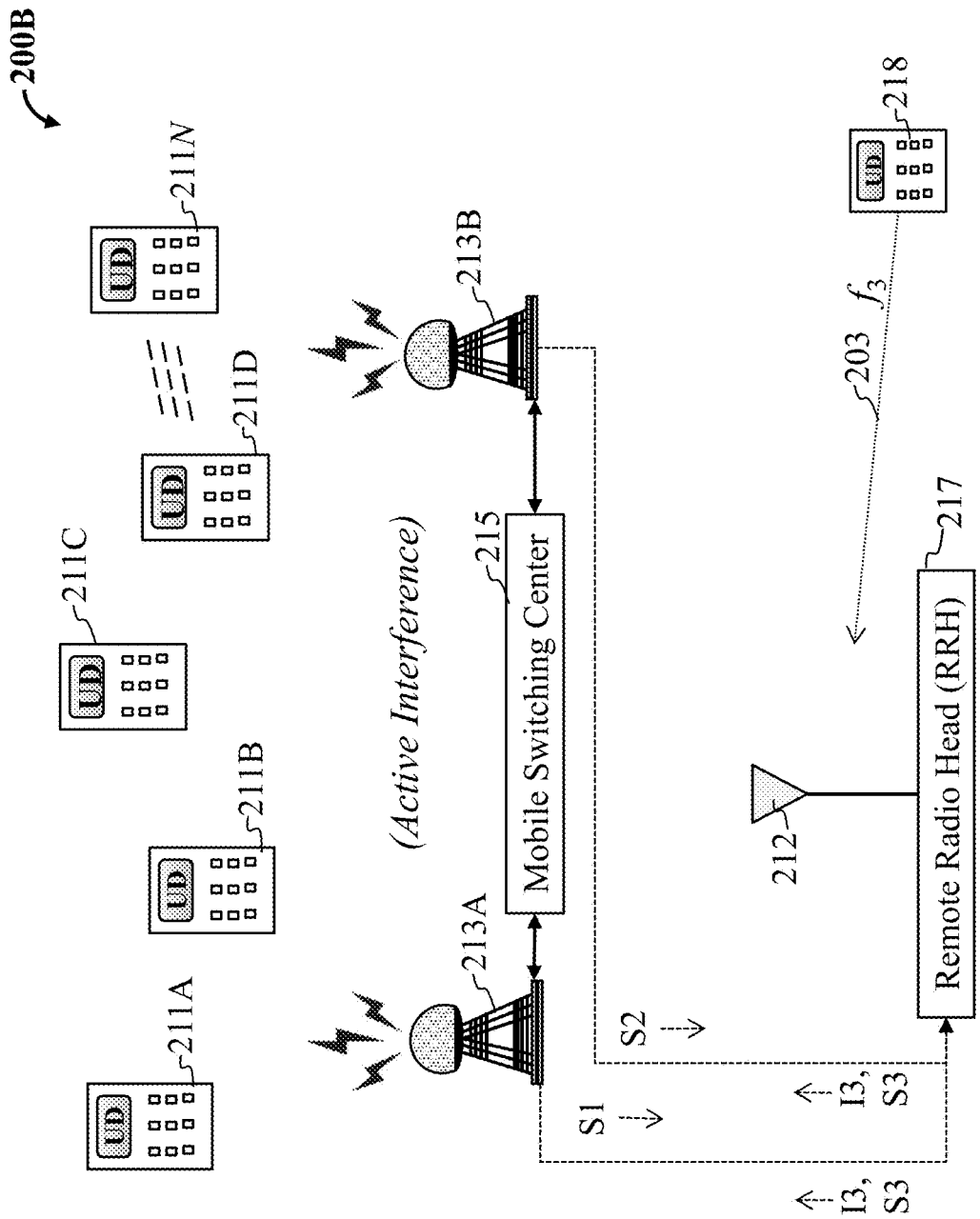
FIG. 2B is a schematic illustrating some active interference of the communication network, according to embodiments of the present disclosure.

FIG. 2B is a schematic illustrating active interference in the communication network, according to some embodiments of the present disclosure. As noted above, active intermodulation happens in active electronics systems where two or more signals within a system or from external sources combines and create its frequency multiples and products. For example, this can occur when active devices are contained in an output stage of transmitter, any portion of an inline amplifier or an input stage of receivers. FIG. 2B shows an example of a wireless communication system 200B (also can be referred as a cellular wireless network) where active interference is present. User devices 211A-211N can be cell phone devices or any wireless user device that are configured to communication with basestations 223A, 223B. The basestations 223A, 223B can be in communication with a switching center 215, as well as a Remote Radio Head (RRH) 217. Each of the above devices, i.e. User devices 211A-211N, basestations 223A, 223B, and RRH, individually include components such as transmitters, power amplifiers, receivers, etc., wherein each component or a combination of components can produce active intermodulation.

Active intermodulation can negatively affect signals being communication between anyone of the above devices, resulting in degraded performance of one or all of the components in the wireless communication system. For example, some signals that may be effected by active intermodulation can be a downlink signal (i.e. a first downlink signal S1 sent from the base station 223A, i.e. base station modem unit, and a second downlink signal S2 sent from the base station 213B, i.e. base station modem unit), sent to the Remote Radio Head (RRH) unit 217). The downlink signals, as well as uplink signals, can include sample streams on a data link such as a Common Public Radio Interface (CPRI) or Open Base Station Architecture Initiative (OBSAI) data link. The data link can carry both uplink and downlink CPRI data streams. The uplink and the downlink data streams may each carry data representing many uplink and downlink signals. For example, the signals S1 and S2 shown in FIG. 2B can be a sub-set of many downlink signals carried in the downlink data stream, and the received uplink signal S3 sent from a wireless unit 218 can be a sub-set of many uplink signals carried in the uplink data stream. The base stations 213A, 213B can be mounted in a cabinet on the ground, by non-limiting example. The Remote Radio Head 217 can include upconverter and downconverter units and can be mounted on a tower geographically near the base stations 213A, 213B and next to an antenna 212 or antennas of the RRH 217.

Some sources of intermodulation can be produced by multiple signal sources within a system sharing same antenna can lead to intermodulation, for example duplexers used in LTE bands share a common antenna to transmit and receive. Signal lines running closely in circuit boards can lead to crosstalk and intermodulation. A mismatch of transmitting antenna handling multiple frequencies can cause reflection of signals which mix with other frequency band and results intermodulation. Also, faulty electronic components and low quality components in the circuits can introduce intermodulation. Further, an increased number of wireless transmitting devices for multiples applications can also contribute to higher levels of undesired signal distortion. Such that, the higher levels of distortion cause interruption to any wireless communication devices. In regard to power amplifiers, active intermodulation can be a significant issue with today's increase technological wireless communication demands.

Passive Interference

FIG. 2C is a schematic illustrating passive interference in the communication network, according to some embodiments of the present disclosure. FIG. 2C illustrates the components of FIG. 2B and shows an example of passive interference to a received signal in the communication system 200C (also can be referred as a cellular wireless network).

For example, downlink signals S1, S2 are sent from the base stations 223A, 223B, respectively, to the Remote Radio Head (RRH) unit 217, as sample streams on the data link. The data link can carry both uplink and downlink data streams. The uplink and the downlink data streams each carry data representing many uplink and downlink signals (and the signals S1, S2 can be a sub-set of many downlink signals carried in the downlink data stream), and the received uplink signal S3 sent from the wireless unit 218 can be a sub-set of many uplink signals carried in the uplink data stream. The signals S1, S2 can be upconverted to radio frequency and transmitted at frequencies $f_1$, 205 and $f_2$, 207 respectively. Also, the third signal S3 may be transmitted at frequency $f_3$, 209, i.e. $2 f_1 - f_2 = f_3$. FIG. 2C shows the signals S1, S2 impinge upon a source of non-linear interferences such as passive intermodulation (PIM) 219, for example, a metallic component having an oxide layer between metallic parts or comprising a ferromagnetic material. Intermodulation interferences of the first signal and the second signals S1, S2 can be generated due to the non-linear response of the source of PIM 219.

In addition, passive harmonic interferences of each of the first signal and the second signals S1, S2 may also be generated. For example, the first signal S1 at frequency $f_1$ and the second signal S2 at frequency $f_2$ may produce, third order interferences at frequencies $2f_1-f_2$ and $2f_2-f_1$, and another order interferences at frequencies $3f_1-2f_2$ and $3f_2-2f_1$. In addition, harmonic interferences of each of the first and second signals S1, S2 may be generated at integer multiples of the respective signal frequencies. Noted, is that the intermodulation and harmonic interferences can occupy a broader range of frequencies than the signals from which they are generated, and there may be more than one received signal falling within the spectrum occupied by the intermodulation and harmonic interferences. In FIG. 2C, it can be seen that intermodulation interferences 13 of the first and second signals S1, S2 are transmitted 209 from the PIM source 219, at $2f_1-f_2$. The intermodulation interferences I3, can fall at least in part, within a received uplink channel at $f_3$ and appear as interference to a received signal S3 that is transmitted 203 at radio frequency from the wireless unit 218 in communication with the base station. The received signal S3 and the intermodulation interferences 13 appear as interference to the received signal can be down converted in the RRH 217 and sent on the data link to the base stations 213A, 213B.

Figure 3:
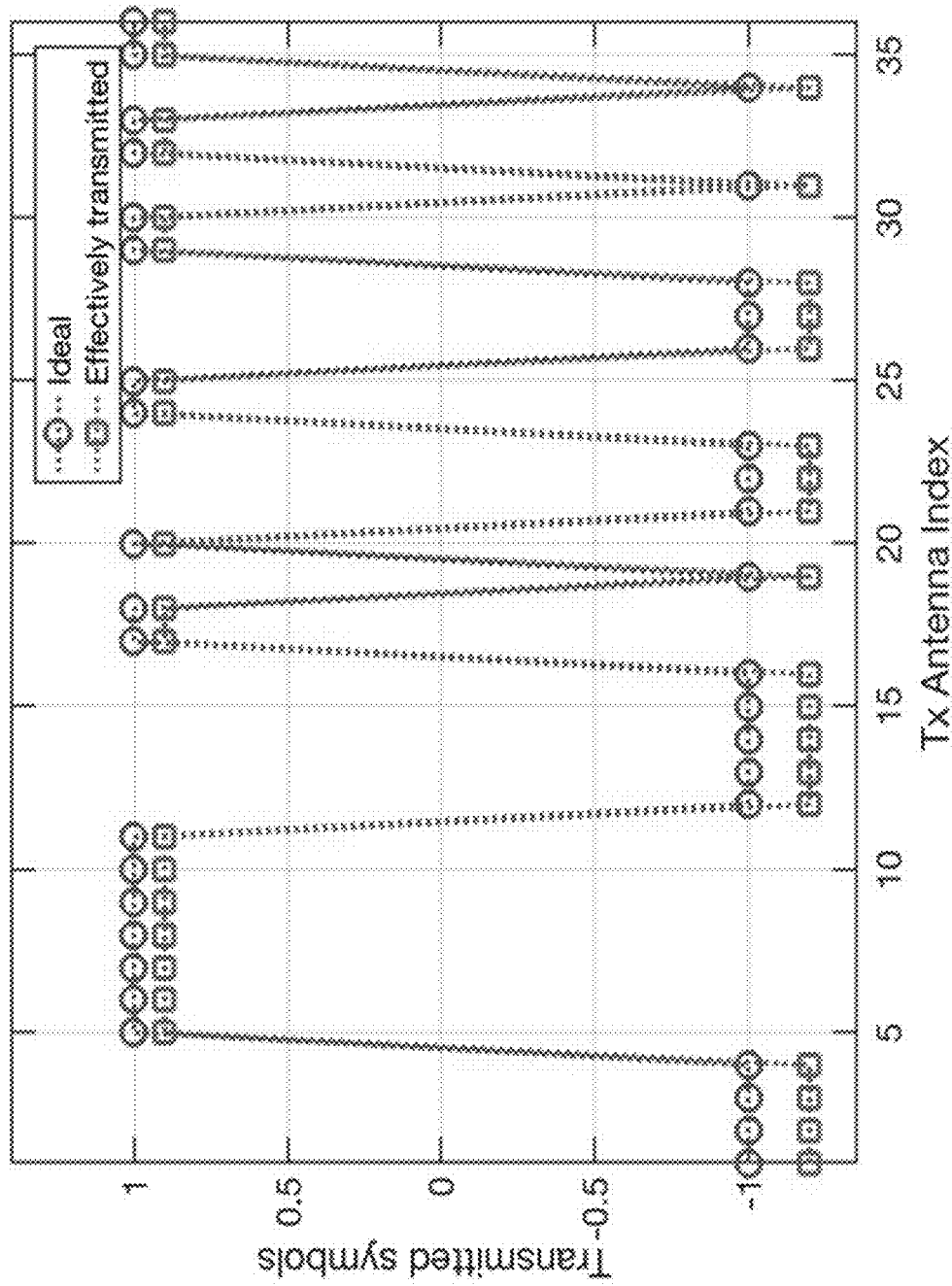
FIG. 3 is a graph illustrating an example of symbol-dependent perturbations on the trans-mitted symbol due to transmit-side impairments on BPSK modulation, where u1=−0.1 and u2=−0.2, according to embodiments of the present disclosure.

FIG. 3 is a graph illustrating an example of symbol-dependent perturbations on the trans-mitted symbol due to transmit-side impairments on BPSK modulation, where u1=−0.1 and u2=−0.2, according to embodiments of the present disclosure. The unperturbed QPSK symbols 2010 over 36 transmitting antennas are shown in circles. Due to symbol-dependent perturbations, the effectively transmitted symbols 2030 are shown in squares. It is seen that the symbols of +1 have a perturbation of u1=−0.1, while the symbols of −1 have a perturbation of u2=−0.2.

Figure 4A:
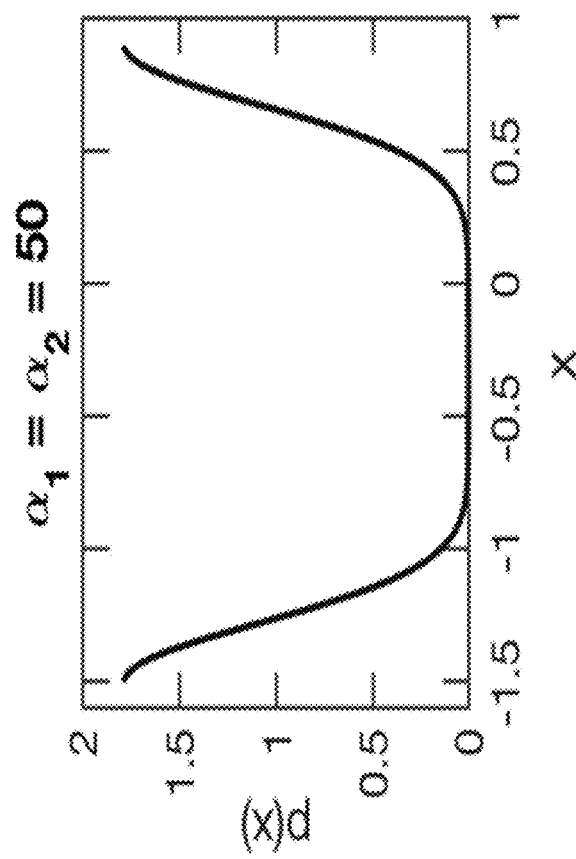
FIG. 4A is a graph illustrating a Truncated Gaussian mixture prior $p(x_n)$ for the effectively transmitted symbol $x_n \in [v2=-1.5, v1=0.9]$ with prior precisions $\alpha 1=50$ and $\alpha 2=50$, when u1=−0.1, u2=−0.5 and $\pi=0.5$, according to embodiments of the present disclosure.

FIG. 4A is a graph illustrating a Truncated Gaussian mixture prior p(xn) 410 for the effectively transmitted symbol xn∈[v2=−1.5, v1=0.9] with different prior precisions α1=50 and α2=50, when u1=−0.1, u2=−0.5 and π=0.5, according to embodiments of the present disclosure.

Figure 4B:
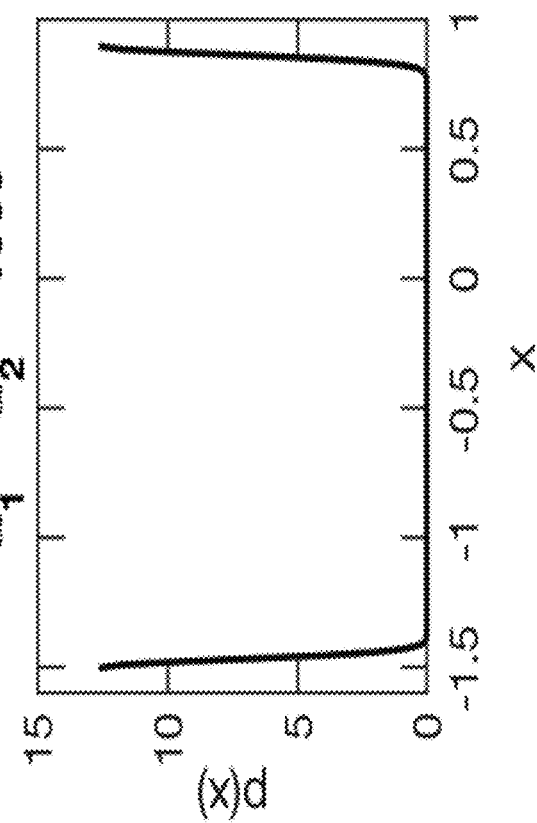
FIG. 4B is a graph illustrating a Truncated Gaussian mixture prior $p(x_n)$ for the effectively transmitted symbol $x_n \in [v2=-1.5, v1=0.9]$ with prior precisions $\alpha 1=1000$ and $\alpha 2=1000$, when u1=−0.1, u2=−0.5 and $\pi=0.5$, according to embodiments of the present disclosure.

FIG. 4B is a graph illustrating a Truncated Gaussian mixture prior p(xn) 430 for the effectively transmitted symbol xn ∈[v2=−1.5, v1=0.9] with different prior precisions α1=1000 and α2=1000, when u1=−0.1, u2=−0.5 and π=0.5, according to embodiments of the present disclosure.

Figure 5:
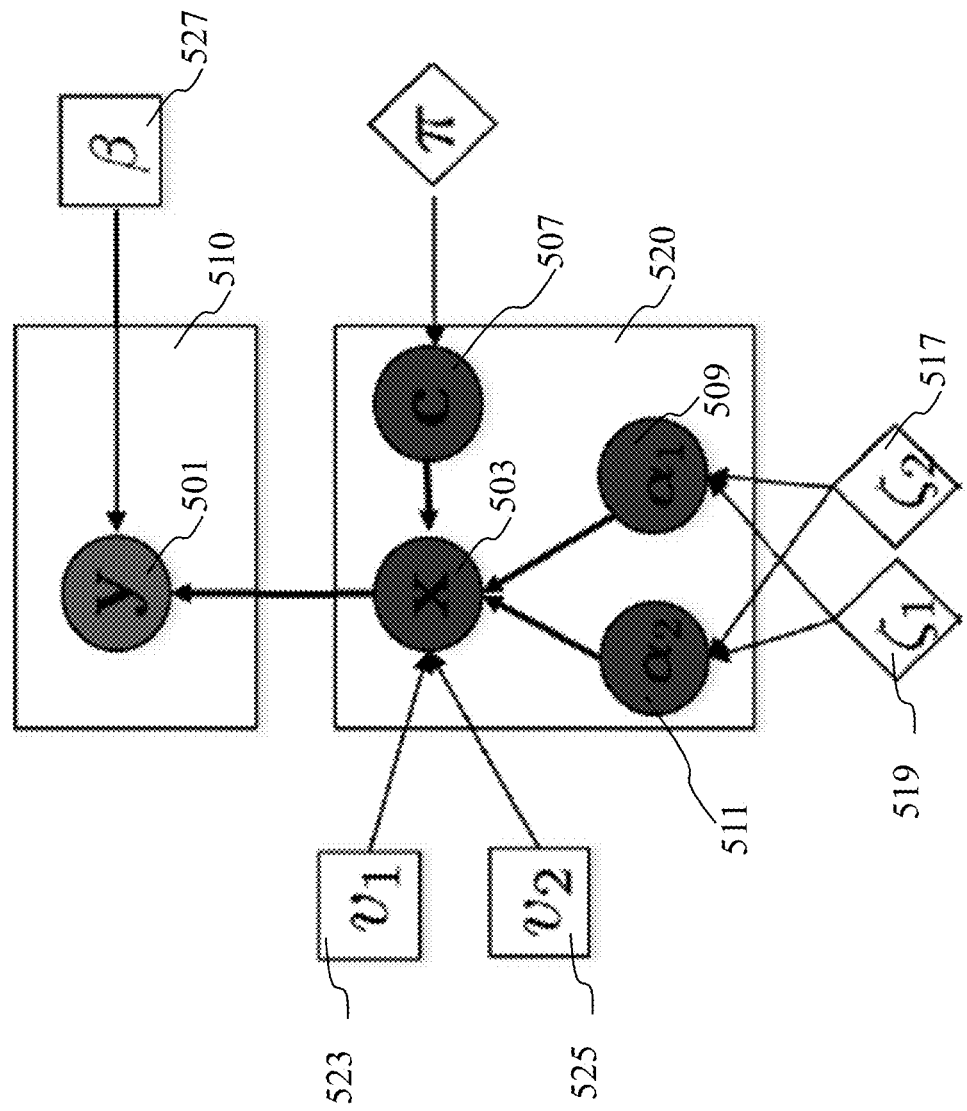
FIG. 5 is a schematic illustrating a graphical representation of the signal model for the massive MIMO system with symbol-dependent impairments including the noise and prior distributions on the unknown coefficients and hyper-prior parameters, according to embodiments of the present disclosure.

FIG. 5 is a schematic illustrating a graphical representation of the signal model for the massive MIMO system with symbol-dependent impairments, according to embodiments of the present disclosure. For example, y 501, the measurement at the receiver side, is an observable random variable denoted by a circle in box 510. Box 520 shows circles 503, 507, 509, 511 that represent hidden random variables including the effectively transmitted symbol x 503, the nominal symbol c 507 and the precision parameters of impairment-induced perturbation $\alpha_1$ 509 and $\alpha_2$ 511. Squares denote the unknown deterministic model parameters including the perturbation boundaries v1 523, v2 525 and the noise variance $\beta^{-1}$ 527. Further, the diamonds 517, 519 denote pre-determined hyperparameters, i.e., the prior probability of the nominal symbol π=0.5 and the hyper-prior parameters $\zeta_1=\zeta_2=10^{-5}$, i.e., wherein the diamonds are represented as ζ1 519 and ζ2 517.

Hierarchical Signal Model

It is noted that the elements of x takes either of the binary values $\{v_2=-1+u_2, v_1=1+u_1\}$. In order to explore this binary nature, we impose independent truncated Gaussian mixture prior distributions on the elements of x, $$p(x_n \mid \alpha_{n1}, \alpha_{n2}, c_n; v_1, v_2), \quad (10)$$

$$x_n \in [v_2, v_1], = \left[\frac{\mathcal{N}(x_n; v_1, \alpha_{n1}^{-1})}{\eta_{n1}}\right]^{c_n} \cdot \left[\frac{\mathcal{N}(x_n; v_2, \alpha_{n2}^{-1})}{\eta_{n2}}\right]^{1-c_n},$$

where $c_n \in \{0,1\}$ is a binary label variable for the n-th element xn, and $\eta_{n1}=0.5-\Phi(-2v\sqrt{\alpha_{n1}})$ and $\eta_{n2}=-0.5+\Phi(2v\sqrt{\alpha_{n2}})$ are the normalization factors with $v=1+(u_1-u_2)/2$ and $\Phi(\cdot)$ denoting the cumulative distribution function of the standard normal distribution.

In addition, the binary label vector $c=[c_2, \ldots c_N]^t$ follows an i.i.d.
Bernoulli distribution with parameter π, $$p(c_n; \pi) = (\pi)^{c_n}(1-\pi)^{1-c_n}, \quad (11)$$

With (10) and (11), the prior distribution of xn is given as $$p(x_n \mid \alpha_{n,1}, \alpha_{n,2}; v_1, v_2) = \quad (12)$$

$$\sum_{c_n \in \{0,1\}} p(x_n \mid \alpha_{n,1}, \alpha_{n,2}, c_n; v_1, v_2) p(c_n; \pi) =$$

$$\pi \frac{\mathcal{N}(x_n; v_1, \alpha_{n1}^{-1})}{\eta_{n1}} + (1-\pi)\frac{\mathcal{N}(x_n; v_2, \alpha_{n2}^{-1})}{\eta_{n2}},$$

where $x_n \in [v_2, v_1]$. FIG. 4A shows the truncated Gaussian mixture prior p(x) when the symbol-dependent perturbations are given as $u_1=-0.1$ and $u_2=-0.5$ (resulting in $[v_2, v_1]=[-1.5, 0.9]$) with different prior precisions $\alpha_1$ and $\alpha_2$. As shown in FIG. 4B, larger prior precisions ($\alpha_1$ and $\alpha_2$) push the prior distribution of xn towards its boundaries and hence it better captures the binary nature of xn over some unknown intervals.

Furthermore, we treat the perturbation precision, ($\alpha_1$ and $\alpha_2$), as i.i.d. random variables and specify the Gamma distribution as hyperpriors over these precision variables, $$p(\alpha_1, \alpha_2; \zeta_1, \zeta_2) = \prod_{i=1}^{2}\prod_{n=1}^{N} \text{Gamma}(\alpha_{ni} \mid \zeta_1, \zeta_2), \quad (13)$$

where $\alpha_1=[\alpha_{11}, \ldots, \alpha_{N1}]^T$, $\alpha_2=[\alpha_{12}, \ldots, \alpha_{N2}]^T$, and $$\text{Gamma}(\alpha \mid \zeta_1, \zeta_2) = \Gamma(\zeta_1)^{-1}\zeta_2^{\zeta_1}\alpha^{\zeta_1-1}e^{-\zeta_2\alpha}, \quad (14)$$

with $\zeta_1=\zeta_2=10^{-6}$ for non-informative hyperpriors on $\alpha_1$ and $\alpha_2$ which allows the precisions to be arbitrarily large and, hence, the posterior entries of $x_n$ can be push towards to the two boundaries (recall the impact of $\alpha_1$ and $\alpha_2$ in FIG. 4A and FIG. 4B. Overall, the hierarchical truncated Gaussian mixture model can be described in a graphical representation shown in FIG. 5, where hidden random variables (red circles) are given as $\{x, c, \alpha_1, \alpha_2\}$, unknown model parameters include the two unknown boundary parameters $\{v_1, v_2\}$ and noise variance $\beta^{-1}$, and pre-determined hyperparameters include the prior symbol probability of π=0.5 and the hyper-prior parameters $\zeta_1=\zeta_2=10^{-5}$.

Figure 6:
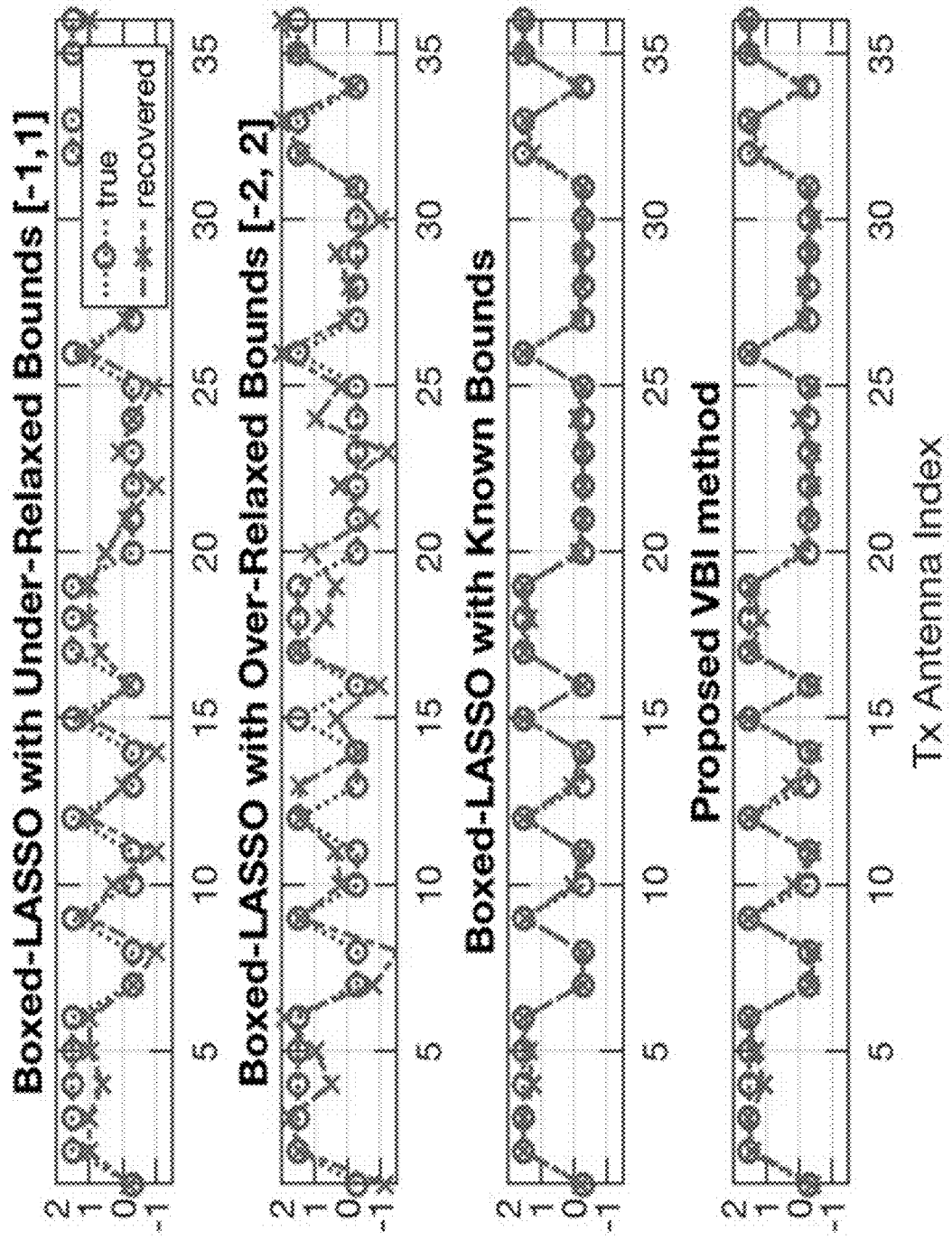
FIG. 6 are graphs illustrating effectively transmitted symbols in circles and estimated symbols from existing and proposed methods u1=0.5, u2=0.7 when SNR=20 dB, according to embodiments of the present disclosure.

FIG. 6 are graphs illustrating recovered transmitted symbol ∈[−0.3, 1.5] with $u_1=0.5$, $u_2=0.7$ using various methods when SNR=20 dB, according to embodiments of the present disclosure. For example, FIG. 6 shows an illustrative example of the recovered transmitted signal xn for all considered methods when SNR=20 dB. It is shown that the boxed-LASSO approach with mismatched bounds gives more fluctuating estimates of xn over the proposed estimates.

The subplot of 610 shows the results of the boxed-LASSO algorithm when the pre-specified bounds are less than the true bounds. The subplot of 630 shows the results of the boxed-LASSO algorithm when the pre-specified bounds are higher than the true bounds. The subplot of 650 shows the results of the boxed-LASSO algorithm when the pre-specified bounds are the same as the true bounds. The subplot of 670 shows the results of the proposed algorithm without knowing the bounds.

Numerical Results

In this section, numerical results are provided to evaluate the proposed symbol detector. Specifically, we consider the a MIMO system of N=M=32 transmit and receive antennas with BPSK modulation. The symbol-dependent perturbation is u1=0.5 and u2=0.7 which results in $[v_2, v_1]=[-0.3, 1.5]$. The channel matrix is generated as the Gaussian matrix with zero mean and unit variance. The SNR is defined on a basis of per receive-antenna, i.e., $SNR=\|Ax\|^2/(M\sigma^2)$. We compare the proposed symbol detector with the boxed-LASSO approach of (8) with 1) under relaxed bounds $[-1, 1]$, 2) over-relaxed bounds $[-2, 2]$, and 3) known bounds $[-0.3, 1.5]$ which is expected to provide performance benchmark for all methods.

Figure 7A:
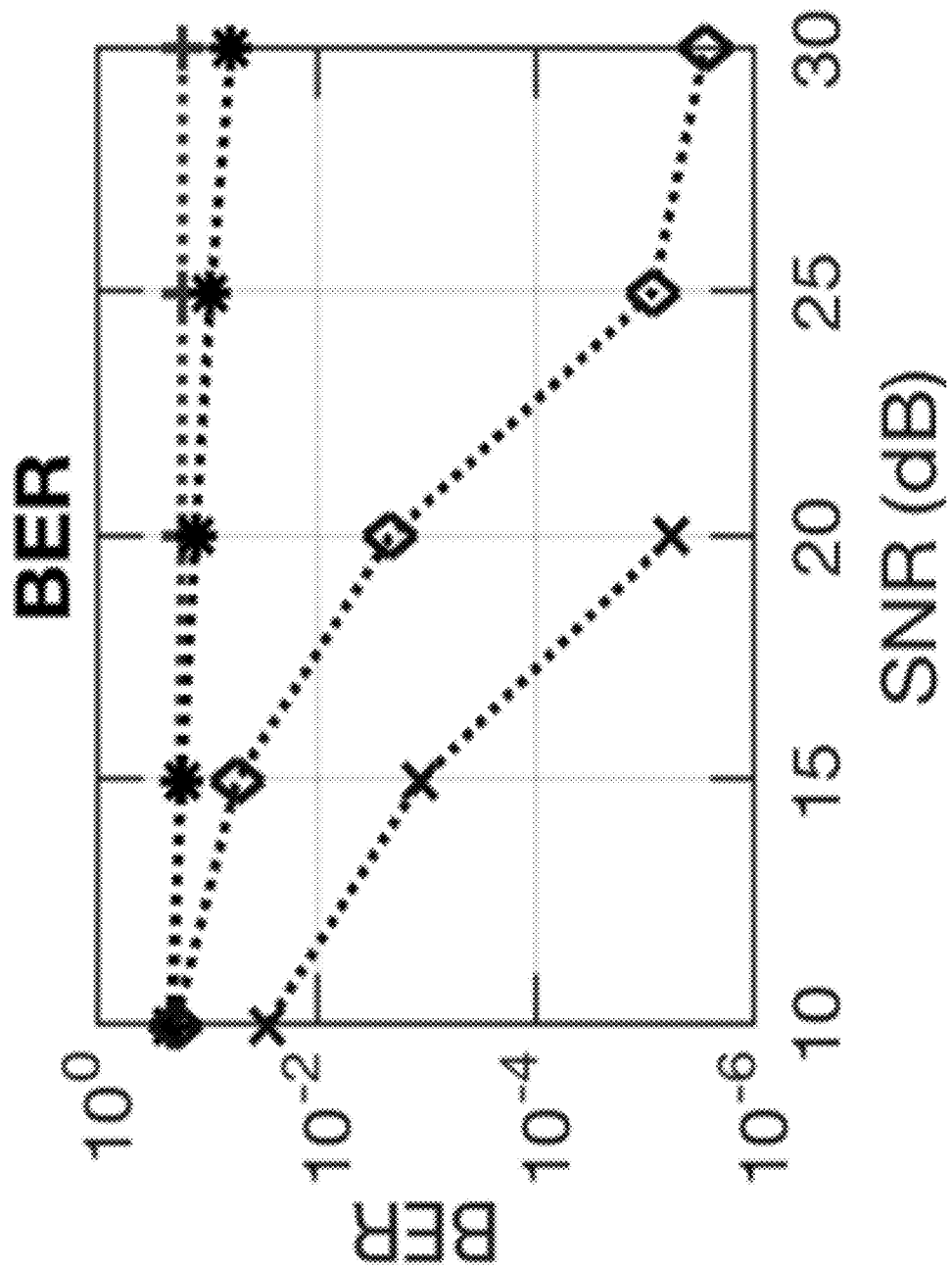
FIG. 7A is a graph illustrating a performance comparison in terms of normalized MSE as a function of SNRs, according to embodiments of the present disclosure.

FIG. 7A is a graph illustrating a performance comparison in terms of normalized MSE as a function of SNRs for the above four algorithms, according to embodiments of the present disclosure. For example, FIG. 7A shows the bit error rate (BER) for all considered methods when SNR varies from 10 dB to 30 dB. It is clear that the boxed-LASSO approach with known bounds provides the best performance while the ones with mismatched bounds give worse performance. The proposed VBI approach gives better performance than the boxed-LASSO with either under-relaxed bounds or over-relaxed bounds.

Figure 7B:
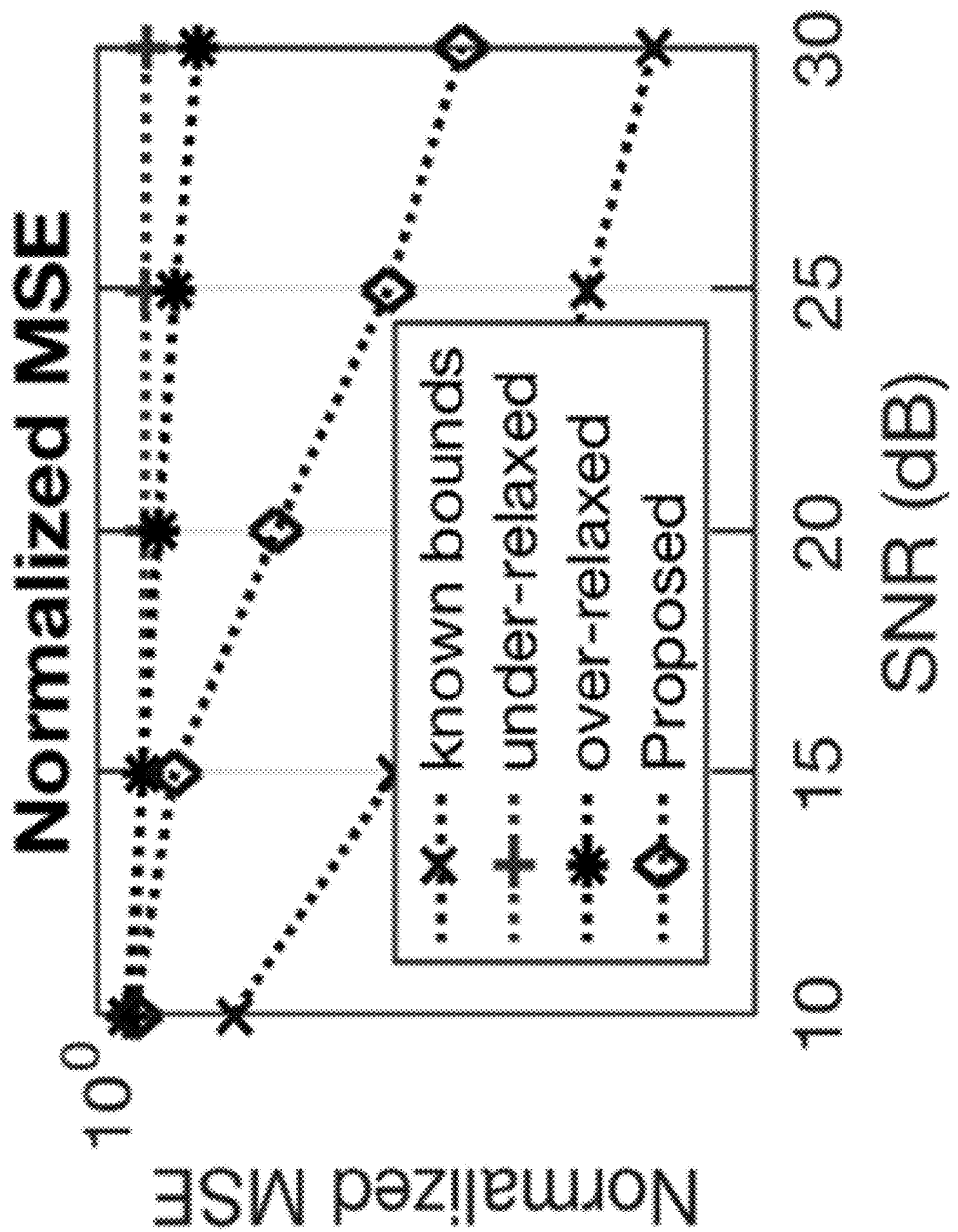
FIG. 7B is a graph illustrating a performance comparison in terms of BER as a function of SNRs, according to embodiments of the present disclosure.

FIG. 7B is a graph illustrating a performance comparison in terms of normalized MSE as a function of SNRs for the above four algorithms, according to embodiments of the present disclosure. For example, FIG. 7B shows the normalized $MSE\|\hat{x}-x\|_2^2/\|x\|_2^2$ for all considered methods.

Thus, aspects of the present disclosure show the variational Bayesian symbol detection for the massive MIMO system that is subject to symbol-dependent transmit-side impairments. Specifically, a truncated Gaussian mixture prior distribution is imposed to the perturbed transmitted symbol to capture the binary nature. With a hierarchical signal model, the posterior distributions of all hidden variables, e.g., the effectively transmitted symbols, and closed-form updating formulas for unknown model parameters, e.g., the unknown impairment induced perturbation parameters, are obtained.

Figure 8:
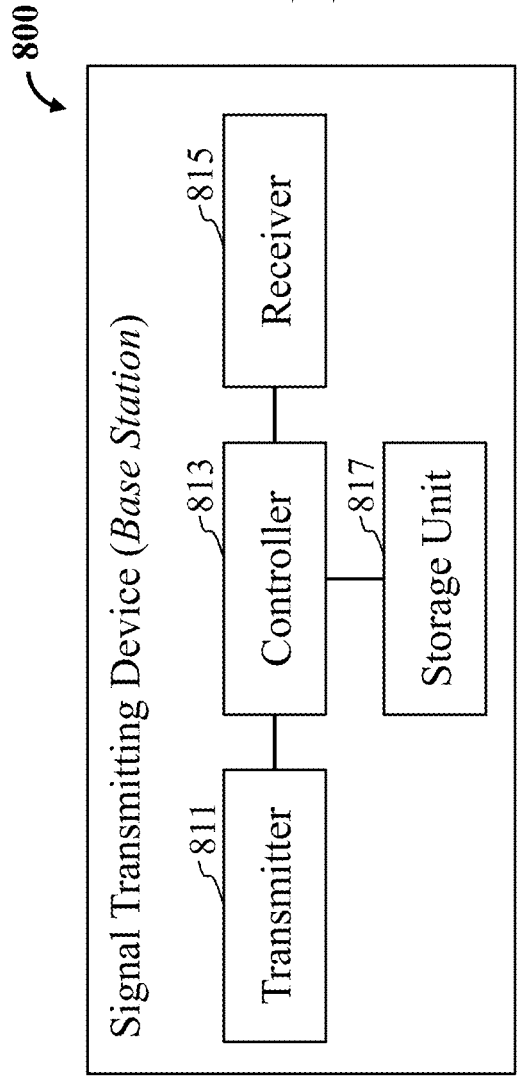
FIG. 8 is a block diagram of a signal transmitting apparatus 800 in a multi-user MIMO communication system, according to some embodiments of the present disclosure.

FIG. 8 is a block diagram of a signal transmitting apparatus 800 in a multi-user MIMO communication system, according to some embodiments of the present disclosure. The signal transmitting apparatus 800 can include a transmitter 811, a controller 813, a receiver 815, and a storage unit 817. Wherein the controller 813 can control the overall operation of the signal transmitting apparatus 800. For example, the controller 813 can control the signal transmitting apparatus 800 to perform transmitting a signal to at least one user equipment.

The transmitter 811 transmits various signals, messages, and the like to a signal receiving apparatus, such as the user equipment, and the like, under control of the controller 813.

The various signals, messages, and the like, transmitted by the transmitter 811 can include a perturbation quantity including a non-linear effect.

The receiver 815 receives various signals, messages, and the like from a signal receiving apparatus, such as the user equipment, and the like, under control of the controller 813.

The storage unit 817 stores various data necessary for the operation of the signal transmitting apparatus 800, information related to the operation, and the like. The storage unit 817 can store the various signals, messages, and the like received in the receiver 815.

While the transmitter 811, the controller 813, the receiver 815, and the storage unit 817 are described as separate processors, it is to be understood that this is merely for convenience of description. In other words, two or more of the transmitter 811, the controller 813, the receiver 815, and the storage unit 817 may be incorporated into a single processor.

An inner structure of a signal transmitting apparatus 800 in a multi-user MIMO communication system according to an embodiment of the present disclosure is described above with reference to FIG. 8, and an inner structure of a signal receiving apparatus in a multi-user MIMO communication system according to an embodiment of the present disclosure is described below with reference to FIG. 9.

Figure 9:
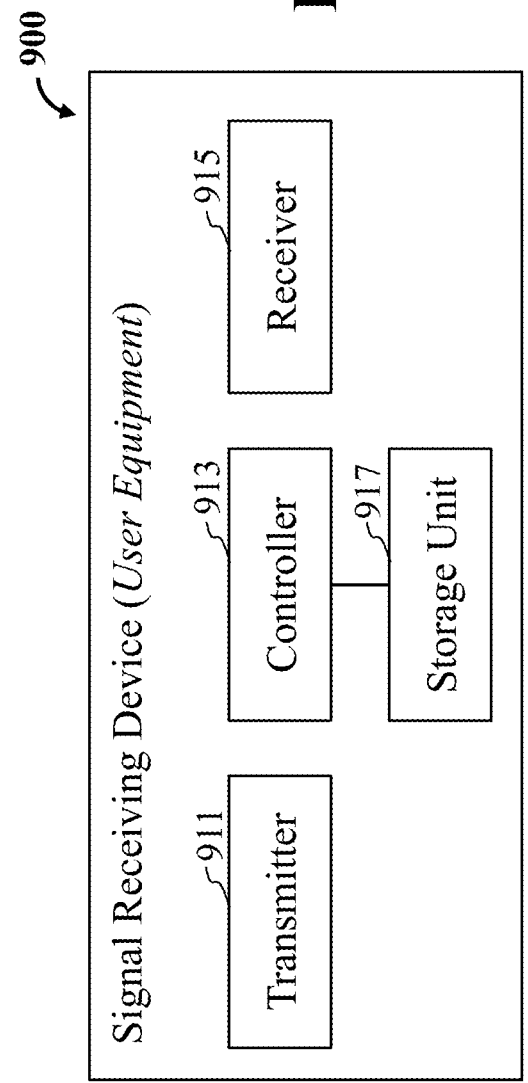
FIG. 9 is a block diagram of a signal receiving apparatus 900 in a multi-user MIMO communication system according to an embodiment of the present disclosure.

FIG. 9 is a block diagram of a signal receiving apparatus 900 in a multi-user MIMO communication system according to an embodiment of the present disclosure. The signal receiving apparatus 900 can be the user equipment and include a transmitter 911, a controller 913, a receiver 915, and a storage unit 917.

The controller 913 can control the overall operation of the signal receiving apparatus 900. Wherein, the controller 913 controls the signal receiving apparatus 900 to perform a recovery of the unknown symbols according to an embodiment of the present disclosure, i.e., an operation related to recovery of the unknown symbols perturbed by the perturbation quantity and to identify symbol dependent perturbations.

The transmitter 911 transmits various signals, messages, and the like to a signal transmitting apparatus, and the like under control of the controller 913.

The receiver 915 receives various signals, messages, and the like from a signal transmitting apparatus, such as the base station, and the like, under control of the controller 913.

The storage unit 917 stores various data necessary for the operation of the signal receiving apparatus 900, information related to the operation related to the recovery of the unknown symbols, and the like. The storage unit 917 stores the various signals, messages, and the like received by the receiver 915.

While the transmitter 911, the controller 913, the receiver 915, and the storage unit 917 are described as separate processors, it is to be understood that this is merely for convenience of description. In other words, two or more of the transmitter 911, the controller 913, the receiver 915, and the storage unit 917 may be incorporated into a single processor.

Figure 10A:
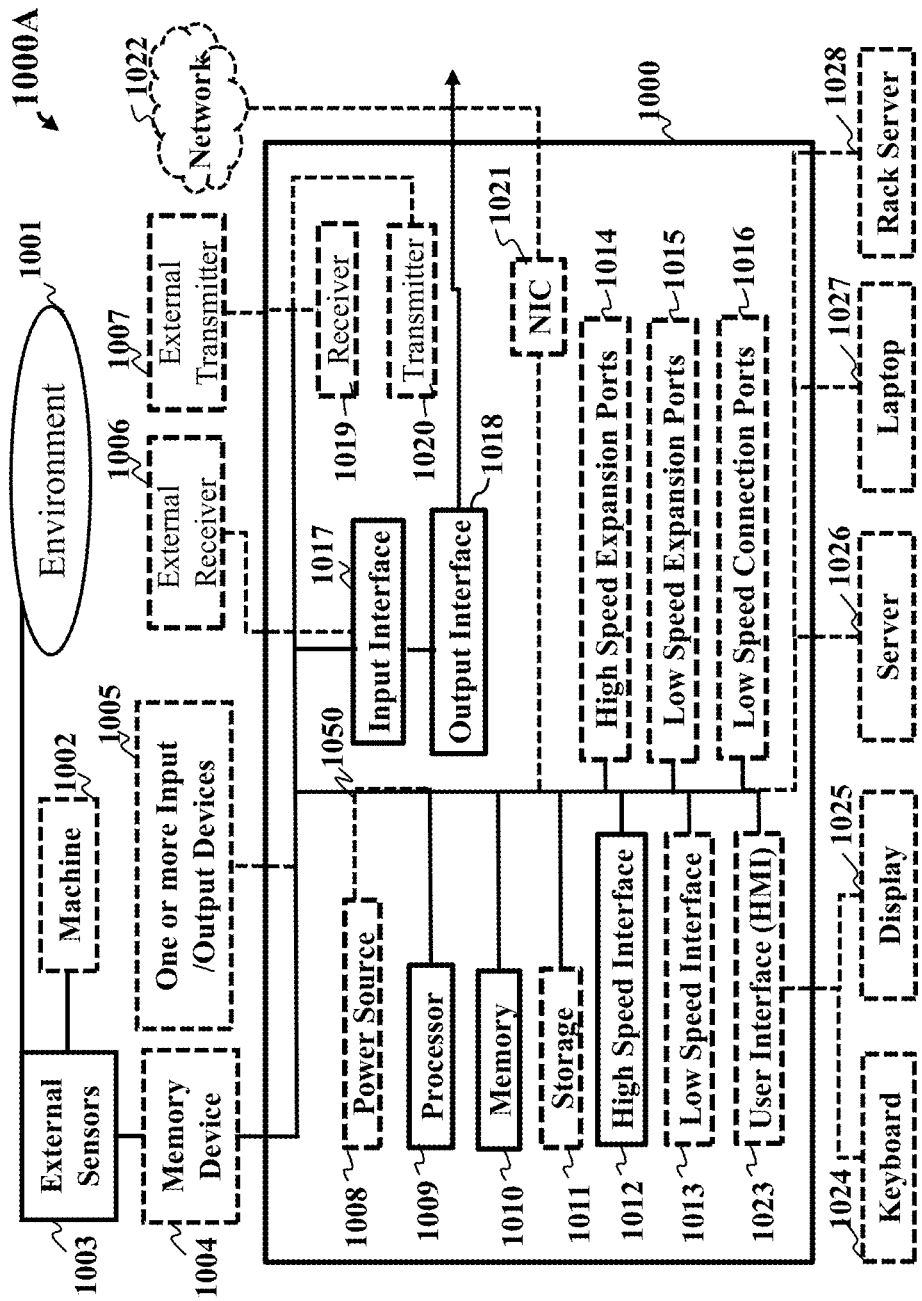
FIG. 10A is a schematic illustrating a computing apparatus that can be used to implement some techniques of the methods and systems, according to embodiments of the present disclosure.

FIG. 10A is a schematic illustrating by non-limiting example a computing apparatus 1000A that can be used to implement some techniques of the methods and systems, according to embodiments of the present disclosure. The computing apparatus or device 1000A represents various forms of digital computers, such as laptops, desktops, workstations, personal digital assistants, servers, blade servers, mainframes, and other appropriate computers.

The computing device 1000A can include a power source 1008, a processor 1009, a memory 1010, a storage device 1011, all connected to a bus 1050. Further, a high-speed interface 1012, a low-speed interface 1013, high-speed expansion ports 1014 and low speed connection ports 1015, can be connected to the bus 1050. Also, a low-speed expansion port 1016 is in connection with the bus 1050. Contemplated are various component configurations that may be mounted on a common motherboard, by non-limiting example, depending upon the specific application. Further still, an input interface 1017 can be connected via bus 1050 to an external receiver 1006 and an output interface 1018. A receiver 1019 can be connected to an external transmitter 1007 and a transmitter 1020 via the bus 1050. Also connected to the bus 1050 can be an external memory 1004, external sensors 1203, machine(s) 1002 and an environment 1001. Further, one or more external input/output devices 1005 can be connected to the bus 1050. A network interface controller (NIC) 1021 can be adapted to connect through the bus 1050 to a network 1022, wherein data or other data, among other things, can be rendered on a third party display device, third party imaging device, and/or third party printing device outside of the computer device 1000A.

Contemplated is that the memory 1010 can store instructions that are executable by the computer device 1000A, historical data, and any data that can be utilized by the methods and systems of the present disclosure. The memory 1010 can include random access memory (RAM), read only memory (ROM), flash memory, or any other suitable memory systems. The memory 1010 can be a volatile memory unit or units, and/or a non-volatile memory unit or units. The memory 1010 may also be another form of computer-readable medium, such as a magnetic or optical disk.

Still referring to FIG. 10A, a storage device 1011 can be adapted to store supplementary data and/or software modules used by the computer device 1000A. For example, the storage device 1011 can store historical data and other related data as mentioned above regarding the present disclosure. Additionally, or alternatively, the storage device 1011 can store historical data similar to data as mentioned above regarding the present disclosure. The storage device 1011 can include a hard drive, an optical drive, a thumb-drive, an array of drives, or any combinations thereof. Further, the storage device 1011 can contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1009), perform one or more methods, such as those described above.

The system can be linked through the bus 1050 optionally to a display interface or user Interface (HMI) 1023 adapted to connect the system to a display device 1025 and keyboard 1024, wherein the display device 1025 can include a computer monitor, camera, television, projector, or mobile device, among others.

Still referring to FIG. 10A, the computer device 1000A can include a user input interface 1017 adapted to a printer interface (not shown) can also be connected through bus 1050 and adapted to connect to a printing device (not shown), wherein the printing device can include a liquid inkjet printer, solid ink printer, large-scale commercial printer, thermal printer, UV printer, or dye-sublimation printer, among others.

The high-speed interface 1012 manages bandwidth-intensive operations for the computing device 1000A, while the low-speed interface 1013 manages lower bandwidth-intensive operations. Such allocation of functions is an example only. In some implementations, the high-speed interface 1012 can be coupled to the memory 1010, a user interface (HMI) 1023, and to a keyboard 1024 and display 1025 (e.g., through a graphics processor or accelerator), and to the high-speed expansion ports 1014, which may accept various expansion cards (not shown) via bus 1050. In the implementation, the low-speed interface 1013 is coupled to the storage device 1011 and the low-speed expansion port 1015, via bus 1050. The low-speed expansion port 1015, which may include various communication ports (e.g., USB, Bluetooth, Ethernet, wireless Ethernet) may be coupled to one or more input/output devices 1005, and other devices a keyboard 1024, a pointing device (not shown), a scanner (not shown), or a networking device such as a switch or router, e.g., through a network adapter.

Still referring to FIG. 10A, the computing device 1000A may be implemented in a number of different forms, as shown in the figure. For example, it may be implemented as a standard server 1026, or multiple times in a group of such servers. In addition, it may be implemented in a personal computer such as a laptop computer 1027. It may also be implemented as part of a rack server system 1028. Alternatively, components from the computing device 1000A may be combined with other components in a mobile device (not shown), such as a mobile computing device 1000B. Each of such devices may contain one or more of the computing device 1000A and the mobile computing device 1000B, and an entire system may be made up of multiple computing devices communicating with each other.

Figure 10B:
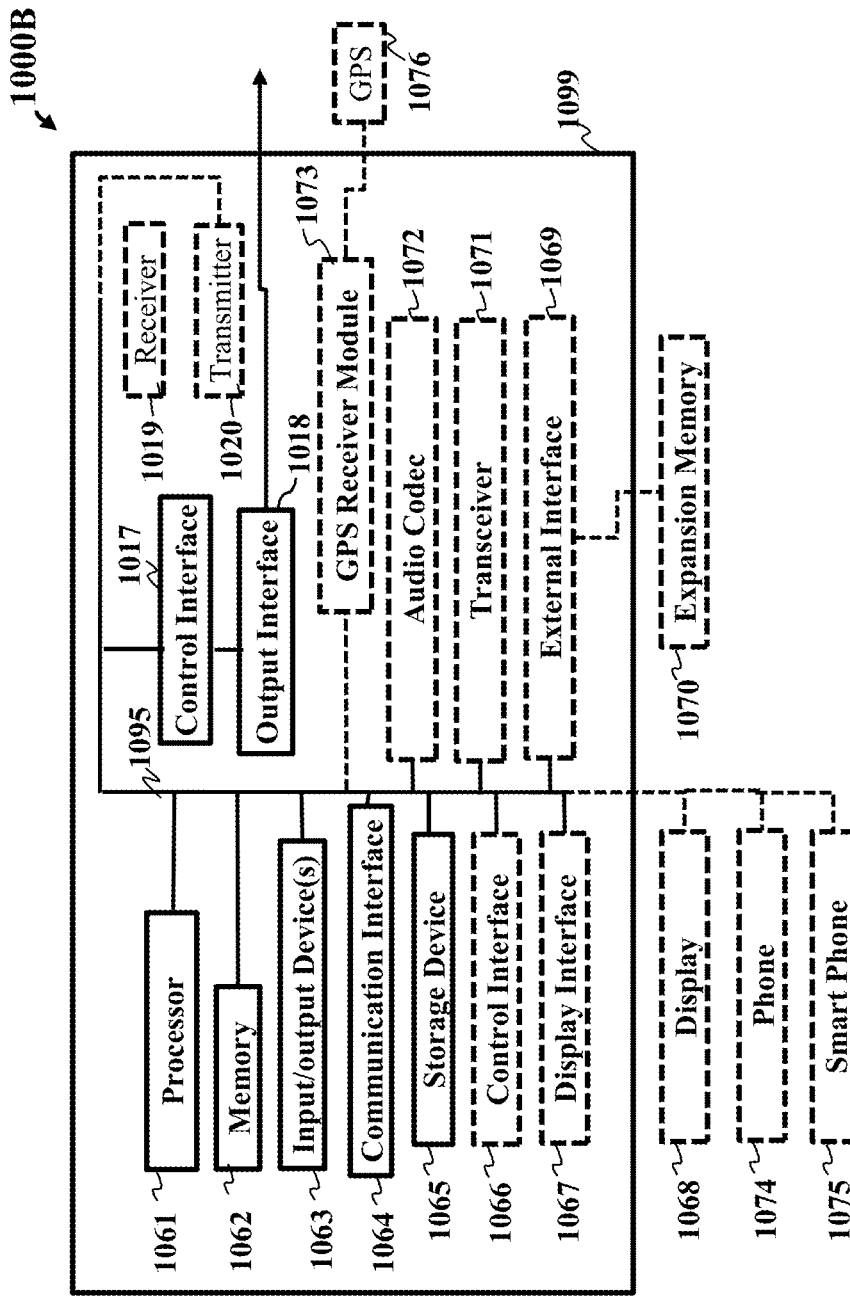
FIG. 10B is a schematic illustrating a mobile computing apparatus that can be used to implement some techniques of the methods and systems, according to embodiments of the present disclosure.

FIG. 10B is a schematic illustrating a mobile computing apparatus that can be used to implement some techniques of the methods and systems, according to embodiments of the present disclosure. The mobile computing device 1000B includes a bus 1095 connecting a processor 1061, a memory 1062, an input/output device 1063, a communication interface 1064, among other components. The bus 1095 can also be connected to a storage device 1065, such as a micro-drive or other device, to provide additional storage.

Referring to FIG. 10B, the processor 1061 can execute instructions within the mobile computing device 1000B, including instructions stored in the memory 1062. The processor 1061 may be implemented as a chipset of chips that include separate and multiple analog and digital processors. The processor 1061 may provide, for example, for coordination of the other components of the mobile computing device 1000B, such as control of user interfaces, applications run by the mobile computing device 1000B, and wireless communication by the mobile computing device 1000B. Contemplated are various component configurations that may be mounted on a common motherboard, by non-limiting example, 1099, depending upon the specific application.

The processor 1061 may communicate with a user through a control interface 1066 and a display interface 1067 coupled to the display 1068. The display 1068 may be, for example, a TFT (Thin-Film-Transistor Liquid Crystal Display) display or an OLED (Organic Light Emitting Diode) display, or other appropriate display technology. The display interface 1067 may comprise appropriate circuitry for driving the display 1068 to present graphical and other information to a user. The control interface 1066 may receive commands from a user and convert them for submission to the processor 1061. In addition, an external interface 1069 may provide communication with the processor 1061, so as to enable near area communication of the mobile computing device 1000B with other devices. The external interface 1069 may provide, for example, for wired communication in some implementations, or for wireless communication in other implementations, and multiple interfaces may also be used.

Still referring to FIG. 10B, the memory 1062 stores information within the mobile computing device 1000B. The memory 1062 can be implemented as one or more of a computer-readable medium or media, a volatile memory unit or units, or a non-volatile memory unit or units. An expansion memory 1070 may also be provided and connected to the mobile computing device 1099 through an expansion interface 1069, which may include, for example, a SIMM (single in line memory module) card interface. The expansion memory 1070 may provide extra storage space for the mobile computing device 1099, or may also store applications or other information for the mobile computing device 1099. Specifically, the expansion memory 1070 may include instructions to carry out or supplement the processes described above, and may include secure information also. Thus, for example, the expansion memory 1070 may be providing as a security module for the mobile computing device 1099, and may be programmed with instructions that permit secure use of the mobile computing device 1000B. In addition, secure applications may be provided via the SIMM cards, along with additional information, such as placing identifying information on the SIMM card in a non-hackable manner.

The memory 1062 may include, for example, flash memory and/or NVRAM memory (non-volatile random access memory), as discussed below. In some implementations, instructions are stored in an information carrier, that the instructions, when executed by one or more processing devices (for example, processor 1000B), perform one or more methods, such as those described above. The instructions can also be stored by one or more storage devices, such as one or more computer or machine readable mediums (for example, the memory 1062, the expansion memory 1070, or memory on the processor 1062). In some implementations, the instructions can be received in a propagated signal, for example, over the transceiver 1071 or the external interface 1069.

The mobile computing apparatus or device 1000B of FIG. 10B is intended to represent various forms of mobile devices, such as personal digital assistants, cellular telephones, smart-phones, and other similar computing devices. The mobile computing device 1000B may communicate wirelessly through the communication interface 1064, which may include digital signal processing circuitry where necessary. The communication interface 1064 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1071 using a radio-frequency. In addition, short-range communication may occur, such as using a Bluetooth, Wi-Fi, or other such transceiver (not shown). In addition, a GPS (Global Positioning System) receiver module 1073 may provide additional navigation and location related wireless data to the mobile computing device 1000B, which may be used as appropriate by applications running on the mobile computing device 1000B.

The mobile computing device 1000B may also communicate audibly using an audio codec 1072, which may receive spoken information from a user and convert it to usable digital information. The audio codec 1072 may likewise generate audible sound for a user, such as through a speaker, e.g., in a handset of the mobile computing device 1000B. Such sound may include sound from voice telephone calls, may include recorded sound (e.g., voice messages, music files, etc.) and may also include sound generated by applications operating on the mobile computing device 1200B.

Still referring to FIG. 10B, the mobile computing device 1000B may be implemented in a number of different forms, as shown in the figure. For example, it may be implemented as a cellular telephone 1074. It may also be implemented as part of a smart-phone 1075, personal digital assistant, or other similar mobile device.

Features

A system for processing a perturbation quantity received in a wireless network, the perturbation quantity including a non-linear effect from at least one transmitted signal of the wireless network. Wherein at least one Base Station (BS) includes at least one antenna configured for data transmission. Such that the BS is configured for wireless communication with a User Equipment (UE) in the wireless network, and the BS is configured to establish a link between the BS and the UE, to provide a plurality of transmitted and uplink data streams. The system including a processing circuit, configured to implement receiver-side decoders. Wherein at least one receiver-side decoder of the receiver-side decoders is configurable to provide a remotely configurable recovery of unknown symbols perturbed by the perturbation quantity, wherein the recovery is at a receiver-side and the perturbation is at the transmitter-side. Such that the receiver is either for an uplink transmission at the BS or for a downlink transmission at the UE. Provide receiver-side decoding for symbol detection of symbol-dependent transmit-side perturbations by imposing a hierarchical signal model on the transmitted symbol. Wherein the decoding that is provided by the receiver-side decoders is used to recover the unknown symbols perturbed by the perturbation quantity and to identify symbol dependent perturbations, to reduce an amount of decoding processing costs by either the UE or the BS. A control element in communication with the processing circuit to implement an action, based on the recovery of the unknown symbols perturbed by the perturbation quantity. The following aspects are intended to either individually or in combination, create one or more embodiments based on the one or more combination of aspects listed below.

According to aspects of the present disclosure, the perturbation quantity includes one or a combination of non-linear impairments generated by non-linear characteristics of active devices, non-linear impairments generated by passive devices, non-linear impairments generated by harmonics in active devices or non-linear impairments generated by harmonics in passive devices. Further, an aspect can be that the non-linear impairments generated by the non-linear characteristics of the active devices include one or a combination of non-linearities of power amplifiers, in-phase and quadrature (I/Q) imbalance, phase-drifts due to non-ideal oscillators, or carrier frequency offsets. Another aspect can be that the non-linear impairments generated by the non-linear characteristics of the active devices include active devices that must be biased with an external power source which is not an input signal, and that the active devices are turned-on. Still another aspect is that the non-linear impairments generated by passive devices include one or a combination of cables or antennas of the wireless network subjected to two or more high power tones.

Another aspect can be that the BS is a Base Transceiver Station (BTS) and the at least one antenna is an MIMO antenna array configured for beamforming and MIMO transmission. Or an aspect can be the hierarchical signal model on the transmitted symbol is a low-complexity symbol detection algorithm, that incorporates a hierarchical truncated Gaussian mixture prior model. Wherein it is possible that the hierarchical truncated Gaussian mixture prior model is further imposed on the perturbed transmitted symbol to enforce a finite alphabet nature, or that the low-complexity symbol detection algorithm uses principles of variational Bayesian inference to develop a factorized or decoupled iterative detection algorithm.

Another aspect of the present disclosure can include a control element in communication with the processing circuit to implement an action, based on the recovery of the unknown symbols perturbed by the perturbation quantity.

Another aspect of the present disclosure can steps to implement the hierarchical signal model include update the receiver-channel-based likelihood via decoupled GAMP; update the posterior of the effectively transmitted symbols which are truncated Gaussian variables with updated distribution parameters; update the posterior of precision variables which are independent Gamma variables with updated distribution parameters; update the posterior of label variables which are independent Bernoulli variables with updated distribution parameters; and update the model parameters (hyper-parameters) by finding the optimized perturbation to the recovered symbols.

Definitions

Active devices—non-linear systems are generally composed of active components/devices, meaning that the components must be biased with an external power source which is not the input signal (i.e. the active components must be "turned on").

Passive devices may exhibit a non-linear transmission characteristic to some degree, for example due to an oxide layer at a metal to metal contact, and the non-linear characteristic may develop with time as an ageing process of the component. Furthermore, PIM or PH may be caused by devices in the signal path between the transmitter and the receiver that are external to the transceiver equipment and which may be outside the operator's control, such as metallic objects on the antenna tower or other objects in the signal path through the propagation environment, such as fences; this is known as the "rusty bolt" effect. Interference due to PIM or PH may reduce the carrier to interference ratio at a receiver, which may reduce coverage by a cell significantly. Conventionally, as a solution to the problem of suspected interference caused by PIM or PH in a cellular radio network, the source of the PIM or PH may be tracked down by field engineers and a component causing the PIM or PH may be replaced. However, this is labor intensive and relies on the problem being identified in order to alert the field engineers.

Continuing with passive devices, PIM can occur in the passive devices, which may include cables, antennas etc., subjected to two or more high power tones. The PIM product(s) can be the result of the two (or more) high power tones mixing at device nonlinearities such as junctions of dissimilar metals or metal-oxide junctions, such as loose corroded connectors. The higher the signal amplitudes, the more pronounced the effect of the nonlinearities, and the more prominent the intermodulation that occurs—even though upon initial inspection, the system would appear to be linear and unable to generate intermodulation.

Also, the non-linear products can be passive intermodulation (PIM) products including measuring power of PIM products in a detected interference, wherein the measuring relative power of PIM products can be between MIMO branches of an uplink data stream. Wherein determining, if the relative power of PIM products on one branch is higher on one MIMO branch than another MIMO branch, that a likely cause of PIM is damage to equipment on the branch with the higher relative power of PIM products. Wherein the determining, if the relative power of PIM products on one branch is similar between MIMO branches, which a likely cause of PIM is external to the MIMO branches. Wherein the measuring relative power of PIM products is between bands in a multi-band antenna system. Wherein the can include a determining, if the relative power of PIM products on one band is similar to that on another band, which a likely cause of PIM is internal to an antenna or in an external environment. Wherein there can be a calculating of a delay to a source of PIM, such that using the calculated delay can be used to identify a position of a source of PIM.

Massive MIMO is a technology where the number of terminals is much less than the number of base station (mobile station) antennas. In a rich scattering environment, the full advantages of the massive MIMO system can be exploited using simple beamforming strategies such as maximum ratio transmission (MRT), maximum ratio-combining (MRC) or zero forcing (ZF). To achieve these benefits of massive MIMO, accurate CSI should be available perfectly. However, in practice, the channel between the transmitter and receiver is estimated from orthogonal pilot sequences which are limited by the coherence time of the channel Most importantly, in a multicell setup, the reuse of pilot sequences of several co-channel cells will create pilot contamination. When there is pilot contamination, the performance of massive MIMO degrades quite drastically. To alleviate the effect of pilot contamination, the work of proposes a simple pilot assignment and channel estimation method from limited training sequences.

Intermodulation (IM) or intermodulation distortion (IMD) is the amplitude modulation of signals containing two or more different frequencies, caused by nonlinearities or time variance in a system. The intermodulation between frequency components will form additional components at frequencies that are not just at harmonic frequencies (integer multiples) of either, like harmonic distortion, but also at the sum and difference frequencies of the original frequencies and at sums and differences of multiples of those frequencies.

Intermodulation can be caused by non-linear behavior of the signal processing (physical equipment or even algorithms) being used. The theoretical outcome of these non-linearities can be calculated by generating a Volterra series of the characteristic, or more approximately by a Taylor series. Practically all audio equipment has some non-linearity, so it will exhibit some amount of IMD, which however may be low enough to be imperceptible by humans. Due to the characteristics of the human auditory system, the same percentage of IMD is perceived as more bothersome when compared to the same amount of harmonic distortion.

Intermodulation is also usually undesirable in radio, as it creates unwanted spurious emissions, often in the form of sidebands. For radio transmissions this increases the occupied bandwidth, leading to adjacent channel interference, which can reduce audio clarity or increase spectrum usage.

IMD is only distinct from harmonic distortion in that the stimulus signal is different. The same nonlinear system will produce both total harmonic distortion (with a solitary sine wave input) and IMD (with more complex tones). In music, for instance, IMD is intentionally applied to electric guitars using overdriven amplifiers or effects pedals to produce new tones at subharmonics of the tones being played on the instrument.

To understand how non-linear interference is generated at multiple frequencies it is useful to model the non-linear behavior with a simple Taylor series with 1st (linear) and 3rd (non-linear) order terms. This model is:

$$y\ out(t) = c1 \times in(t) + c3 \times in\ 3(t)$$

When the input signal consists of 2 modulated RF carriers, then the input signal can be expressed as $$x\ in(t) = A1(t)\cos[2\pi f1 t + \varphi1(t)] + A2(t)\cos[2\pi f2 t + \varphi2(t)]$$

The first RF carrier in this expression has an amplitude modulation denoted by A1(t), a phase modulation denoted by φ1(t), and an RF carrier frequency of f1.

The output signal has the following 8 frequency components:

$$y\ out(t) = [c1A1(t) + \tfrac{3}{4}c3A13(t) + c3A1(t)A22(t)]\cos[2\pi f1 t + \varphi1(t)] + [c1A2(t) + \tfrac{3}{4}c3A23(t) + c3A12(t)A2(t)]\cos[2\pi f2 t + \varphi2(t)] + \tfrac{1}{2}c3A12(t)A2(t)\cos[2\pi(2f1-f2)t + 2\varphi1(t) - \varphi2(t)] + \tfrac{1}{2}c3A1(t)A22(t)\cos[2\pi(2f2-f1)t + 2\varphi2(t) - \varphi1(t)] + \tfrac{1}{2}c3A12(t)A2(t)\cos[2\pi(2f1+f2)t + 2\varphi1(t) + \varphi2(t)] + \tfrac{1}{2}c3A1(t)A22(t)\cos[2\pi(2f2+f1)t + 2\varphi2(t) + \varphi1(t)] + \tfrac{1}{4}c3A13(t)\cos[2\pi 3f1 t + 3\varphi1(t)] + \tfrac{1}{4}c3A23(t)\cos[2\pi 3f2 t + 3\varphi2(t)]$$

Of all these terms, the only linear terms are those that have A1(t) or A2(t) as their only amplitude modulation terms. The rest are non-linear interference terms, and can cause problems if any of them couple into a receiver that is operating in a frequency channel that overlaps with a non-linear interference term. Real non-linear behavior can also exhibit even-order non-linear terms, and terms with higher than 3rd order. The input signal in the above equation has 2 modulated carriers. However, the input signal can have multiple carriers at more than 2 frequencies, and can also have multiple carriers at the same frequency (an example of the latter is MIMO streams). The carriers do not need to be at an RF carrier frequency to cause non-linear interference. An example is a strong signal that generates distortion in the analog-to-digital converter in the analog baseband domain in a receiver.

Nonlinear distortion is a term used (in fields such as electronics, audio and telecommunications) to describe the phenomenon of a non-linear relationship between the "input" and "output" signals of, for example, an electronic device. Nonlinearity can have several effects, which are unwanted in typical situations. The $\alpha_3$ term for example would, when the input is a sine wave with frequency ω, as shown as $$v = \left(a_1 + \frac{3}{4}a_3\right)\sin(\omega t) - \frac{1}{4}a_3\sin(3\omega t)$$

result in an extra sine wave at 3ω, as shown below.

In certain situations, this spurious signal can be filtered away because the "harmonic" 3ω, lies far outside the frequency range used, but in cable television, for example, third order distortion could cause a 200 MHz signal to interfere with the regular channel at 600 MHz.

Nonlinear distortion applied to a superposition of two signals at different frequencies causes the circuit to act as a frequency mixer, creating intermodulation distortion.

IQ imbalance is a performance-limiting issue in a design of direct conversion receivers, also known as zero intermediate frequency (IF) or homodyne receivers. . . . IQ imbalances occur due to mismatches between the parallel sections of the receiver chain dealing with the in-phase (I) and quadrature (Q) signal paths. In electrical engineering, a sinusoid with angle modulation can be decomposed into, or synthesized from, two amplitude-modulated sinusoids that are offset in phase by one-quarter cycle (π/2 radians). All three functions have the same center frequency. The amplitude modulated sinusoids are known as the in-phase and quadrature components.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. An apparatus for processing a perturbation quantity received in a wireless network, the perturbation quantity including a non-linear effect from at least one transmitted signal of the wireless network, the apparatus comprising:
   at least one Base Station (BS) having at least one antenna configured for data transmission, wherein the BS is configured for wireless communication with a User Equipment (UE) in the wireless network, and the BS is configured to establish a link between the BS and the UE, to provide a plurality of transmitted and uplink data streams;
   a processing circuit, configured to
      implement receiver-side decoders, wherein at least one receiver-side decoder of the receiver-side decoders is configurable to provide a remotely configurable recovery of unknown symbols perturbed by the perturbation quantity, wherein the recovery is at a receiver-side and the perturbation is at the transmitter-side, such that the receiver is either for an uplink transmission at the BS or for a downlink transmission at the UE; and provide receiver-side decoding for symbol detection of symbol-dependent transmit-side perturbations by imposing a hierarchical signal model on the transmitted symbol, and wherein the decoding that is provided by the receiver-side decoders is used to recover the unknown symbols perturbed by the perturbation quantity and to identify symbol dependent perturbations, to reduce an amount of decoding processing costs by either the UE or the BS.

2. The apparatus of claim 1, wherein the perturbation quantity includes one or a combination of non-linear impairments generated by non-linear characteristics of active devices, non-linear impairments generated by passive devices, non-linear impairments generated by harmonics in active devices or non-linear impairments generated by harmonics in passive devices.

3. The apparatus of claim 2, wherein the non-linear impairments generated by the non-linear characteristics of the active devices include one or a combination of non-linearities of power amplifiers, in-phase and quadrature (I/Q) imbalance, phase-drifts due to non-ideal oscillators, or carrier frequency offsets.

4. The apparatus of claim 2, wherein the non-linear impairments generated by the non-linear characteristics of the active devices include active devices that must be biased with an external power source which is not an input signal, and that the active devices are turned-on.

5. The apparatus of claim 2, wherein the non-linear impairments generated by passive devices include one or a combination of cables or antennas of the wireless network subjected to two or more high power tones.

6. The apparatus of claim 1, wherein the BS is a Base Transceiver Station (BTS) and the at least one antenna is an MIMO antenna array configured for beamforming and MIMO transmission.

7. The apparatus of claim 1, wherein the hierarchical signal model on the transmitted symbol is a low-complexity symbol detection algorithm, that incorporates a hierarchical truncated Gaussian mixture prior model.

8. The apparatus of claim 7, wherein the hierarchical truncated Gaussian mixture prior model is further imposed on the perturbed transmitted symbol to enforce a finite alphabet nature.

9. The apparatus of claim 7, wherein the low-complexity symbol detection algorithm uses principles of variational Bayesian inference to develop a factorized or decoupled iterative detection algorithm.

10. The apparatus of claim 1, further including a control element in communication with the processing circuit to implement an action, based on the recovery of the unknown symbols perturbed by the perturbation quantity.

11. A system for processing a perturbation quantity received in a wireless network, the perturbation quantity including a non-linear effect from at least one transmitted signal of the wireless network, wherein at least one Base Station (BS) includes at least one antenna configured for data transmission, such that the BS is configured for wireless communication with a User Equipment (UE) in the wireless network, and the BS is configured to establish a link between the BS and the UE, to provide a plurality of transmitted and uplink data streams, the system comprising:

a processing circuit, configured to
implement receiver-side decoders, wherein at least one receiver-side decoder of the receiver-side decoders is configurable to
provide a remotely configurable recovery of unknown symbols perturbed by the perturbation quantity, wherein the recovery is at a receiver-side and the perturbation is at the transmitter-side, such that the receiver is either for an uplink transmission at the BS or for a downlink transmission at the UE; and
provide receiver-side decoding for symbol detection of symbol-dependent transmit-side perturbations by imposing a hierarchical signal model on the transmitted symbol, and wherein the decoding that is provided by the receiver-side decoders is used to recover the unknown symbols perturbed by the perturbation quantity and to identify symbol dependent perturbations, to reduce an amount of decoding processing costs by either the UE or the BS; and
a control element in communication with the processing circuit to implement an action, based on the recovery of the unknown symbols perturbed by the perturbation quantity.

12. The system of claim 11, wherein the perturbation quantity includes one or a combination of non-linear impairments generated by non-linear characteristics of active devices, non-linear impairments generated by passive devices, non-linear impairments generated by harmonics in active devices or non-linear impairments generated by harmonics in passive devices.

13. The system of claim 11, wherein the hierarchical signal model on the transmitted symbol is a low-complexity symbol detection algorithm, that incorporates a hierarchical Gaussian mixture prior model.

14. The system of claim 13, wherein the hierarchical Gaussian mixture prior model is further imposed on the perturbed transmitted symbol to enforce a finite alphabet nature.

15. The system of claim 13, wherein the low-complexity symbol detection algorithm uses principles of variational Bayesian inference to develop a factorized or decoupled iterative detection algorithm.

16. A method for processing a perturbation quantity received in a wireless network, the perturbation quantity including a non-linear effect from at least one transmitted signal of the wireless network, the method comprising:

implementing receiver-side decoders, such that at least one receiver-side decoder of the receiver-side decoders is configurable for
providing a configurable recovery of unknown symbols perturbed by the perturbation quantity, wherein the recovery is at a receiver-side and the perturbation is at the transmitter-side, such that the receiver is either for an uplink transmission at a base station (BS) or for a downlink transmission at a user equipment (UE); and
providing receiver-side decoding for symbol detection of symbol-dependent transmit-side perturbations by imposing a hierarchical signal model on the transmitted symbol, and wherein the decoding that is provided by the receiver-side decoders is used to recover the unknown symbols perturbed by the perturbation quantity and to identify symbol dependent perturbations, to reduce an amount of decoding processing costs by either the UE or the BS, wherein a processing circuit is used to implement the method.

17. The method of claim 16, wherein the hierarchical signal model on the transmitted symbol is a low-complexity symbol detection algorithm, that incorporates a hierarchical truncated Gaussian mixture prior model, such that the hierarchical Gaussian mixture prior model is further imposed on the perturbed transmitted symbol to enforce a finite alphabet nature.

18. The method of claim 16, wherein steps to implement the hierarchical signal model include
- update the receiver-channel-based likelihood via decoupled GAMP;
- update the posterior of the effectively transmitted symbols which are truncated Gaussian variables with updated distribution parameters;
- update the posterior of precision variables which are independent Gamma variables with updated distribution parameters;
- update the posterior of label variables which are independent Bernoulli variables with updated distribution parameters; and
- update the model parameters (hyper-parameters) by finding the optimized perturbation to the recovered symbols.

* * * * *